US006382162B2

(12) United States Patent
Umino et al.

(10) Patent No.: US 6,382,162 B2
(45) Date of Patent: May 7, 2002

(54) VARIABLE INTAKE APPARATUS FOR IN-LINE FOUR-CYLINDER INTERNAL COMBUSTION ENGINE

(75) Inventors: Yoshiyuki Umino; Tatsuya Sagano, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/770,373

(22) Filed: Jan. 29, 2001

(30) Foreign Application Priority Data

| Jan. 31, 2000 | (JP) | ................................ 2000-023113 |
| Feb. 2, 2000 | (JP) | ................................ 2000-025697 |
| Feb. 4, 2000 | (JP) | ................................ 2000-026950 |
| Feb. 16, 2000 | (JP) | ................................ 2000-037601 |

(51) Int. Cl.[7] ........................ F02M 35/10; F02B 27/06
(52) U.S. Cl. .......................... 123/184.55; 123/184.44
(58) Field of Search .................. 123/184.21, 184.42, 123/184.53, 184.55, 184.56, 190.17, 184.43, 184.44, 184.48, 184.49, 336, 337, 164.26, 184.36

(56) References Cited

U.S. PATENT DOCUMENTS

| 4,932,369 A | * | 6/1990 | Parr ....................... 123/184.55 |
| 5,832,894 A | * | 11/1998 | Espe et al. ................ 123/336 |
| 6,016,780 A | * | 1/2000 | Fischer ................... 123/184.26 |
| 6,073,601 A | * | 6/2000 | Guichard et al. ........ 123/184.55 |
| 6,138,628 A | * | 10/2000 | Alex et al. ................ 123/190.1 |
| 6,176,213 B1 | * | 1/2001 | Arnegger ................ 123/184.61 |
| 6,247,438 B1 | * | 6/2001 | Esch et al. ............. 123/184.55 |
| 6,267,091 B1 | * | 7/2001 | Nishida et al. ......... 123/184.55 |

FOREIGN PATENT DOCUMENTS

| JP | 7-30698 | 4/1995 |
| JP | 7-253063 | 10/1995 |
| JP | 10-73024 | 3/1998 |

* cited by examiner

*Primary Examiner*—Noah P. Kamen
*Assistant Examiner*—Hai Huynh
(74) *Attorney, Agent, or Firm*—Armstrong, Westerman & Hattori, LLP

(57) ABSTRACT

A variable intake apparatus for an in-line four-cylinder internal combustion engine includes a rotary valve 3 provided between an intermediate portion along the length of four air intake passages $4_1$ to $4_4$ and an intake air collecting chamber 5, and a control means switching the rotary valve 3 in triple stages in response to the engine speed. The control means is constructed such that at a low speed range, communications are blocked off between the adjacent intake passageways $4_1$ and $4_2$, $4_2$ and $4_3$, $4_3$ and $4_4$, at an intermediate speed range, communications are established between pairs of intake passageways $4_1$ and $4_4$, $4_2$ and $4_3$, and at a high speed range, communications are established not only between the adjacent intake passages $4_1$ and $4_2$, $4_2$ and $4_3$, $4_3$ and $4_4$, but also between the respective air intake passageways $4_1$ to $4_4$ and the intake collecting chamber 5.

16 Claims, 27 Drawing Sheets

VARIABLE INTAKE APPARATUS FOR IN-LINE FOUR-CYLINDER INTERNAL COMBUSTION ENGINE

BACKGROUND OF THE INVENTION

1. Field of the Invention

The present invention relates to an improved variable intake apparatus for an in-line four-cylinder internal combustion engine which can obtain a high intake air charging efficiency and a high output torque over a wide engine speed range of the internal combustion engine from low to high engine speed ranges.

2. Description of the Related Art

Conventionally, various types of intake apparatuses have been proposed which are designed to make use of intake air pressure-wave pulse generated in air intake passages connecting to communicate with the respective cylinders of a multi-cylinder internal combustion engine, so as to obtain an extra charging effect by elevating the pressure at inlet ports of respective cylinders of the engine toward a latter half of an intake stroke in the respective cylinders.

For example, the length and/or volume of intake pipes is varied in response to the speed of an internal combustion engine so as to obtain an inertial supercharging effect and a resonance supercharging effect in supercharging intake air. With a suitable combination thereof, the intake air charging efficiency is highly maintained over a wide engine speed range from low to high engine speed ranges, whereby the output torque of the internal combustion engine is aimed at being improved.

In in-line four-cylinder internal combustion engines, there has been proposed a variable intake apparatus in which the length of air intake passages communicating with respective cylinders of an engine varies in triple stages such as for the low engine speed range, intermediate engine speed range and high engine speed range so as to obtain a high intake air charging efficiency to thereby aim at improving the output torque of the engine (JP-B-7-30698). Further, there has been proposed a variable intake apparatus in which junction portions where air intake passages communicating with respective cylinders of an engine are arranged in such a manner that the air intake passages are connected to the cylinders which do not have successive intake strokes are made to function as a resonating chamber, in which resonating pipes are provided on upstream sides of the resonating chambers so as to connect thereto along a direction in which the cylinders are arranged, and in which a collecting portion is provided upstream of the pair of resonating pipes. And, in the latter variable intake apparatus, the communication between the pair of resonating chambers is blocked off and established for the low and intermediate engine speed range and the high engine speed range of the internal combustion engine so as to obtain a high intake air charging efficiency using resonating and inertial supercharging effects, to thereby aim at improving the output torque of the engine (JP-A-10-73024).

However, with the former variable intake apparatus, two air intake control valves are needed which operate individually, and this increases the number of components used in and weight of the intake apparatus, resulting a problem that the engine is disadvantageous with respect to space. In addition, in the case of the latter variable intake apparatus in which the resonating supercharging effect is used in the low and intermediate engine speed range, the resonating chambers, resonating pipes and collecting chamber need to be provided, and the provision of the pair of resonating pipes increase the size of the intake apparatus itself in the direction in which the cylinders are arranged, this making the engine disadvantageous with respect to the space in the direction in which the cylinders are arranged. Moreover, it has been difficult to obtain a flat intake air charging efficiency at a narrow portion between the low and intermediate engine speed range and the high engine speed range.

There are variable intake apparatuses employing a rotary valve in internal combustion engines (JP-7-253063). However, the rotary valve used in such variable intake apparatuses is such that the rotary valve is switched over in double stages in response to low and high engine speed ranges of the internal combustion engine and that only sealing between adjacent air intake passages is intended by effecting sealing between the adjacent air passages only with simple O-type seal rings.

SUMMARY OF THE INVENTION

An object of the invention is to provide a variable intake apparatus for an in-line four-cylinder internal combustion engine which can solve the problems inherent in the conventional in-line four-cylinder internal combustion engines so as to obtain a high intake air charging efficiency over a wide range of engine speeds such as from the low engine speed range to the high engine speed range of an internal combustion engine to thereby obtain a high output torque and which can reduce the number of components used therein and simplify the construction thereof so as to require less space for provision thereof.

To solve the above object, there is provided a variable intake apparatus for an in-line four-cylinder internal combustion engine, characterized in that:

four air intake passages which are independent from each other and which connect to and communicate with respective cylinders of the in-line four-cylinder internal combustion engine, respectively, at one ends thereof and a single intake air collecting chamber at the other ends thereof are arranged sideways in line with each other in a direction in which the cylinders of the internal combustion engine are arranged; in that the air intake passages are curved so as to wind inwardly, and the intake air collecting chamber is disposed in an internal space in the curved portion of the air intake passages; in that a rotary valve is provided in such a manner that a part of the outer circumference thereof projects into intermediate portions along the length of the air intake passages in an arc-like fashion; in that the rotary valve comprises control means that can be switched over in triple stages at equal intervals in response to the rotational speed of the internal combustion engine; in that the rotary valve establishes or cuts off a communication between the air intake passages which are adjacent to each other or between each of pairs of air intake passages connecting to and communicating with respective cylinders of pairs of cylinders which do not have successive intake strokes, at the one ends thereof; and in that the control means is constructed such that at a low engine speed range of the internal combustion engine, a communication is cut off between the air intake passages which are adjacent to each other, at an intermediate engine speed range of the engine, a communication is established between each of the pairs of air intake passages connecting to and communicating with the respective cylinders of the pairs of cylinders which do not have successive intake strokes at one ends thereof, and at a high engine speed range thereof, a communication is established between the air intake passages which are adjacent to each other.

According to the invention, the four air intake passageways are provided so as to be arranged sideways in line with each other which are independent from each other and which connect to and communicate with respective cylinders of an in-line four-cylinder internal combustion engine, respectively, at one ends and a single intake air collecting chamber at the other ends thereof. As a result, the respective air intake passageways in no case intersect with each other, and the intake apparatus (an intake manifold) can be formed compact in the direction in which the cylinders of the engine are arranged, providing a good space efficiency. Additionally, the equalization of the lengths of the respective air intake passageways can be eased.

In addition, provided between the intermediate portion along the length of the four air intake passageways which are independent from each other and the intake air collecting chamber is the rotary valve which is adapted to establish or cut off a communication in a shortcut fashion between the respective air intake passageways and the intake air collecting chamber, and the rotary valve comprises the control means that can be switched over in triple stages at equal intervals in response to the rotational speed of the internal combustion engine, the control valve being adapted to control and switch over the rotary valve such that, at a low engine speed range of the internal combustion engine, a communication is cut off between the air intake passageways which are adjacent to each other, at an intermediate engine speed range of the engine, a communication is established between each of the pairs of adjacent air intake passageways connecting to and communicating with the respective cylinders of the pairs of cylinders which do not have successive intake strokes at one ends thereof, and at a high engine speed range thereof, a communication is established between the air intake passageways which are adjacent to each other and a communication is also established in a shortcut fashion between the respective air intake passage ways and the intake air collecting chamber.

As a result, at the low engine speed range of the internal combustion engine, the intake air collecting chamber functions as a portion which is open to the atmosphere and hence becomes a reverse chamber where intake pressure wave pulses are reversed, whereby the intake pressure wave pulse inside the long air intake passageways between the combustion chambers and the intake air collecting chamber which has a low natural frequency is tuned to the long opening and closing cycle of the inlet valve based on the low engine speed of the engine to thereby obtain a high inertial supercharging effect, whereby a high intake air charging efficiency can be obtained for each cylinder, thereby making it possible to improve the output torque of the engine.

Moreover, at the intermediate engine speed range, the air intake passageway portions upstream of the communicating portion between the pairs of adjacent air intake passageways connecting to and communicating with the cylinders which do not have successive intake strokes at one ends thereof constitute a resonating system for each of the pairs of cylinders, whereby intake pressure waves remain unreversed in the respective air intake passageways and the communicating portion and can be propagated for the following intake stroke in the other cylinder of the same pair of cylinders, allowing a high resonating supercharging effect to be obtained, so that a high intake air charging efficiency can be obtained for each cylinder of the pair of cylinders which does not have successive intake strokes to thereby improve the output torque, thus making it possible to compensate for drops in intake air charging efficiency and output torque at the intermediate portion between the low and high engine speed ranges.

Furthermore, at the high engine speed range, the communicating chamber between the adjacent air intake passageways functions as the portion which is open to the atmosphere, and the communicating chamber becomes the reverse chamber where intake pressure wave pluses are reversed, whereby the intake air pressure wave pulse in the short air intake passageways extending from the combustion chambers to the communicating chamber which has a high natural frequency is tuned to the short opening and closing cycle of the intake valve based on the high rotational speed of the engine to thereby obtain a high inertial supercharging effect, and this allows a high intake air charging efficiency to be obtained for all the cylinders, thereby making it possible to improve the output torque of the engine. Thus, the high intake air charging efficiency and the high output torque can be obtained over a wide range of engine speed range from the low engine speed range to the high engine speed range.

In addition, at the high engine speed range, since the respective air intake passageways and the intake air collecting chamber are caused to communicate with each other in a shortcut fashion via the rotary valve, the respective air intake passageway portions (long air intake passageway portions)upstream of the communicating chamber between the adjacent air intake passageways are made thinner, and even if the low engine speed range is shifted down towards a lower engine speed side, an intake air flow rate which is required at the high engine speed range can be acquired sufficiently, whereby the intake apparatus can be formed more compact.

Moreover, since the high intake air charging efficiency and the high output torque can be obtained over the wide engine speed range which ranges from the low engine speed area to the high engine speed area by controlling to switch over the rotary valve provided between the intermediate portion along the length of the four air intake passageways which are independent from each other and the intake air collecting chamber in such a manner as to switch it over in triple stages at regular intervals in response to the rotational speed of the internal combustion engine, the number of components such as valves and actuators can be reduced, whereby the production costs can be reduced, the construction and weight of the apparatus can be simplified and reduced, respectively. This eases the provision of the variable intake apparatus for an in-line four-cylinder internal combustion engine which requires less space for installation thereof. In addition, since with the rotary valve, the valve body and the shaft portion thereof do not protrude into the air intake passageways, there is no risk of the intake resistance being increased.

DETAILED DESCRIPTION OF THE PREFERRED EMBODIMENTS

<First Embodiment>

Figure 1:
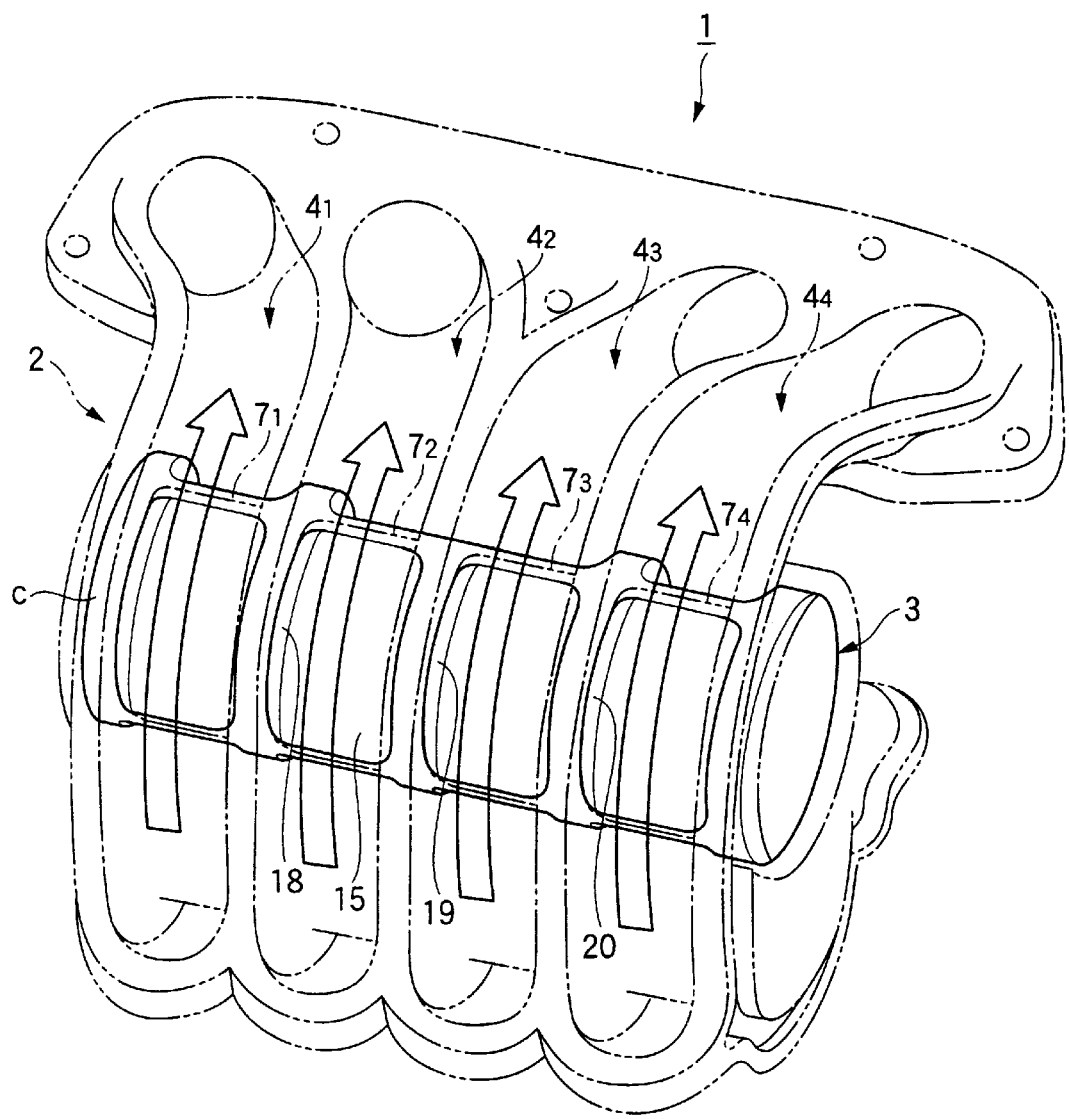
FIG. 1 is a schematic perspective view of a first embodiment of a variable intake apparatus for an in-line four-cylinder internal combustion engine according to the invention, showing an imaginary view of the apparatus as viewed by cutting away an upper half of an air intake passage portion along air intake passages in which the status of a rotary valve when the internal combustion engine is in a low engine speed range thereof is illustrated in conjunction with the status of intake air flowing through the air intake passages in that range.

Referring to FIGS. 1 to 8, a description will be given of a first embodiment of the invention. Note that in the following description, cylinders of the internal combustion engine are arranged in a transverse direction, and that the left-hand side of the variable apparatus shown in FIG. 1 is to be regarded as the left-hand side of the same apparatus when it is installed in place on an automotive vehicle.

Figure 2:
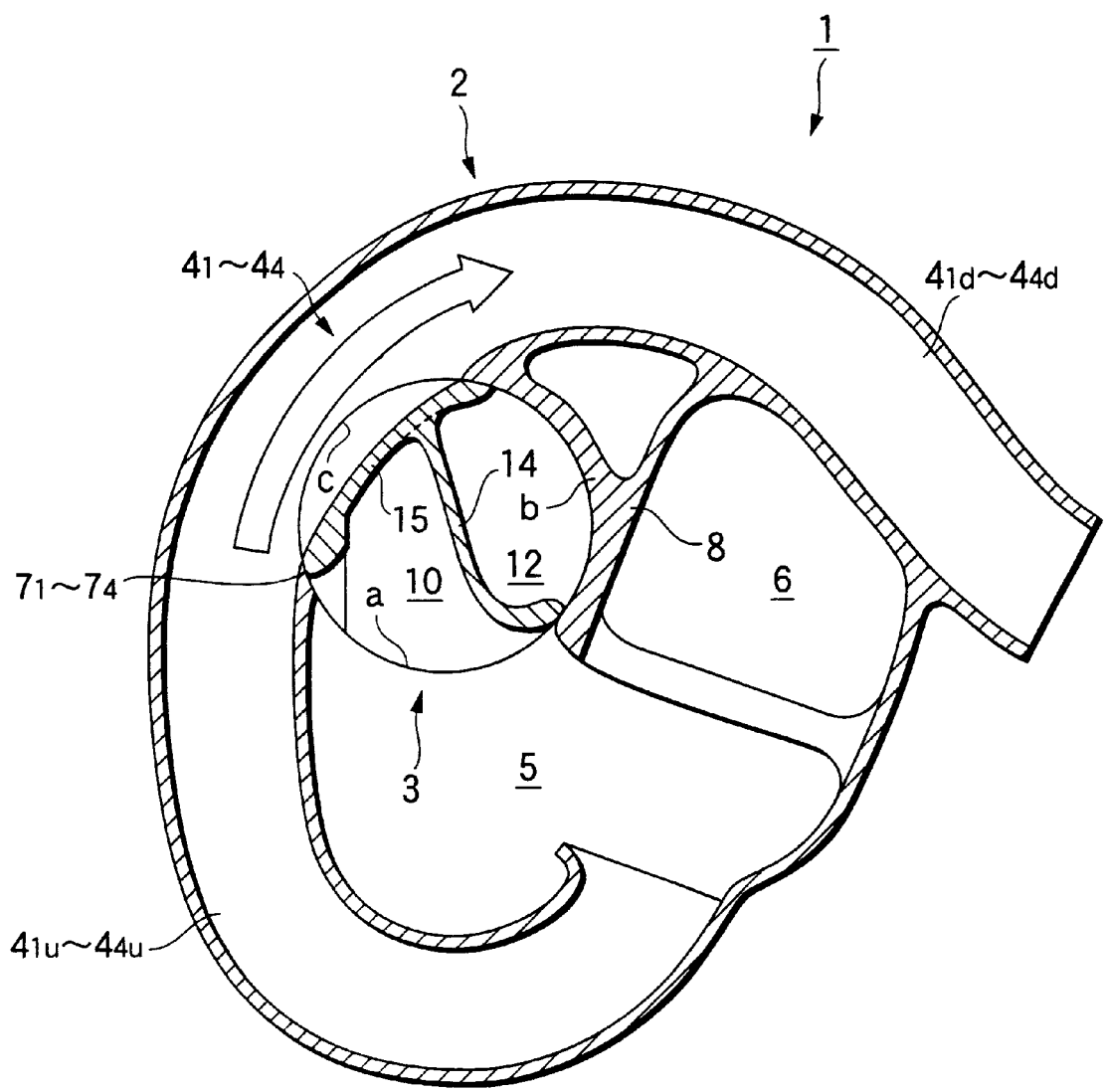
FIG. 2 is a cross-sectional view of the variable intake apparatus of FIG. 1 showing the complete air intake passages.

In FIGS. 1 and 2, a variable intake apparatus 1 for an in-line four-cylinder internal combustion engine according to the invention comprises an intake manifold 2 having juxtaposed first to fourth four air intake passages $4_1$ to $4_4$ which are independent from one another and which connect, respectively, to cylinders Nos. 1 to 4 (not shown) of the internal combustion engine at one ends thereof and to a single intake air collecting chamber 5 at the other ends thereof.

The cylinders Nos. 1 to 4 are fired in the order of cylinder No. 1, cylinder No. 3, cylinder No. 4 and cylinder No. 2. Therefore, intake strokes in the respective cylinders take place in that order, and the cylinders Nos. 1 and 4 constitute a pair of cylinders which does not have successive intake strokes, whereas the cylinders Nos. 2 and 3 constitute a pair of cylinders which does not have successive intake strokes.

According to the construction, the pairs of air intake passages connecting to and communicating with the pair of cylinders which does not have successive intake strokes are the pair of the first and fourth air intake passages $4_1$, $4_4$ connecting to and communicating with the respective cylinders of the pair of cylinders Nos. 1, 4 at one ends thereof and the pair of the second and third air intake passages $4_2$, $4_3$ connecting to and communicating with the respective cylinders of the pair of cylinders Nos. 2, 3 at one ends thereof.

As shown in FIG. 2, the first to fourth air intake passages $4_1$ to $4_4$ are made substantially equal in length and are curved so as to wind inwardly, and an intake air collecting chamber 5 is provided so as to connect to and communicate with distal ends of the air intake passages so wound. This intake air collecting chamber 5 together with an adjacent air intake duct 6 is provided so as to be embraced within an interior space resulting by virtue of the curvature of the curved first to fourth air intake passages $4_1$ to $4_4$ with an intention to make the compact variable intake apparatus 1.

Intake air led to the air intake duct 6 via an air cleaner and a throttle body which are both not shown then flows into the intake air collecting chamber 5 having a relatively large volume, where it is collected. When the internal combustion engine is in its low to intermediate engine speed range, the intake air then flowing out of the intake air collecting chamber 5 is divided so as to flow through the first to fourth air intake passages $4_1$ to $4_4$ which are relatively long passages into the cylinders Nos. 1 to 4 for intake thereinto. Although a communicating path between the intake duct 6 and the intake air collecting chamber 5 is not shown, the communicating path is provided at a central portion along the length of the intake air collecting chamber 5, whereby the length of the air intake passages including the first to fourth air intake passages $4_1$ to $4_4$ which leads from the intake air collecting chamber 5 to the respective cylinders Nos. 1 to 4 is made to be equal.

First to fourth openings $7_1$ to $7_4$ each having a substantially rectangular shape when viewed from the front are formed, respectively, in bottom walls of the first to fourth air intake passages $4_1$ to $4_4$ at intermediate positions along the lengths thereof. And, a single-unit rotary valve 3 is provided such that part thereof (an arc-like portion thereof extending one third the outer circumference thereof) protrudes, respectively, into the first to fourth air intake passages $4_1$ to $4_4$ through the first to fourth openings $7_1$ to $7_4$ and also that part thereof protrudes, respectively, into the first to fourth air intake passages $4_1$ to $4_4$ as viewed from the side in the axial direction thereof (refer to FIG. 2).

This rotary valve 3 is provided in an accommodation chamber between the intermediate position along the length of the respective first to fourth air intake passages $4_1$ to $4_4$ and the intake air collecting chamber 5 for establishing in a shortcut fashion or cutting off in a communication between the respective first to fourth air intake passages $4_1$ to $4_4$ and the intake air collecting chamber 5 via a communicating chamber 10, which will be described later, inside the rotary valve 3, two communicating ports $11_1$, $11_2$ and the first to fourth openings $7_1$ to $7_4$ by being switched over in response to the rotational speed of the internal combustion engine, as will be described later.

A main body wall portion 8 of the intake manifold 2 which constitutes a partition between the accommodation chamber of the rotary valve 3 and the air intake duct 6 has an arc-like surface corresponding to an imaginary circumferential surface of the rotary valve 3 which is one third of the outer circumference of the same valve and functions not only to support the rotational movement of the rotary valve but also to close the communicating chamber 10, which will be described later, and a second communicating chamber (communicating chamber 12, communicating chamber 13) which are both formed inside the rotary valve 3.

Next, the construction, operation and effectiveness of the rotary valve 3 will be described.

As shown in FIG. 2, the rotary valve 3 has three imaginary surfaces a, b, c which are partitioned at equal intervals in the circumferential direction as viewed from the side in an axial direction of the valve, and as will be described in detail below, it is constructed, by sequentially switching over the three imaginary surfaces a, b, c in triple stages in the circumferential direction in response to the rotational speed of the internal combustion engine, such that a communication is established or blocked off between the adjacent air intake passages $4_1$ and $4_4$, $4_4$ and $4_2$, and $4_2$ and $4_3$ or between each of the pairs of adjacent air intake passages $4_1$ and $4_4$, $4_2$ and $4_3$ which connect to and communicate with the respective cylinders of the pairs of cylinders which do not have successive intake strokes and such that a communication is established in a shortcut fashion or blocked off between the respective air intake passages $4_1$ to $4_4$ and the intake air collecting chamber 5.

Figure 3:
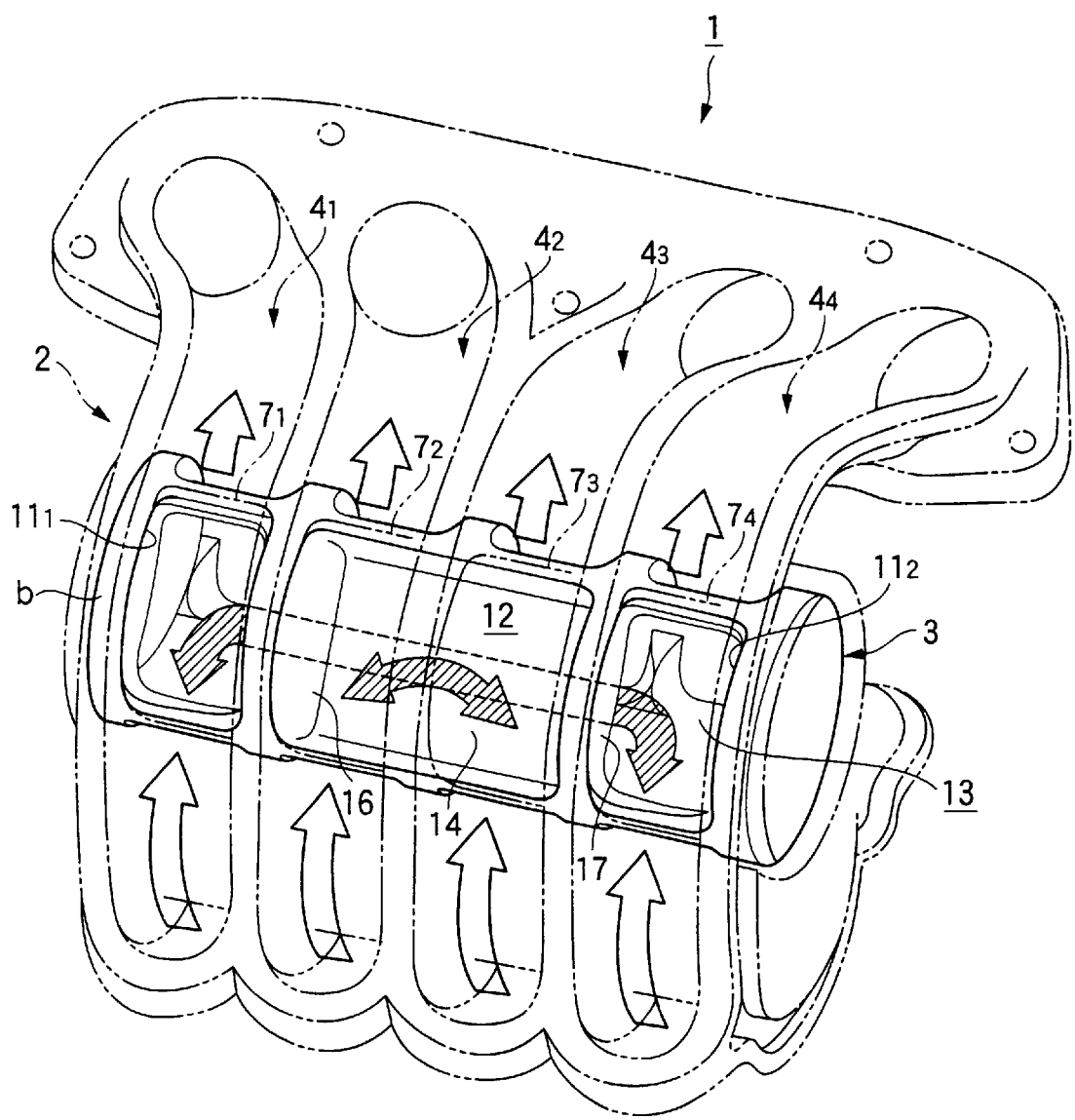
FIG. 3 is a view similar to FIG. 1, showing the status of the rotary valve when the internal combustion engine is in an intermediate engine speed range thereof in conjunction with the status of intake air flowing through the air intake passages in that range.
Figure 5:
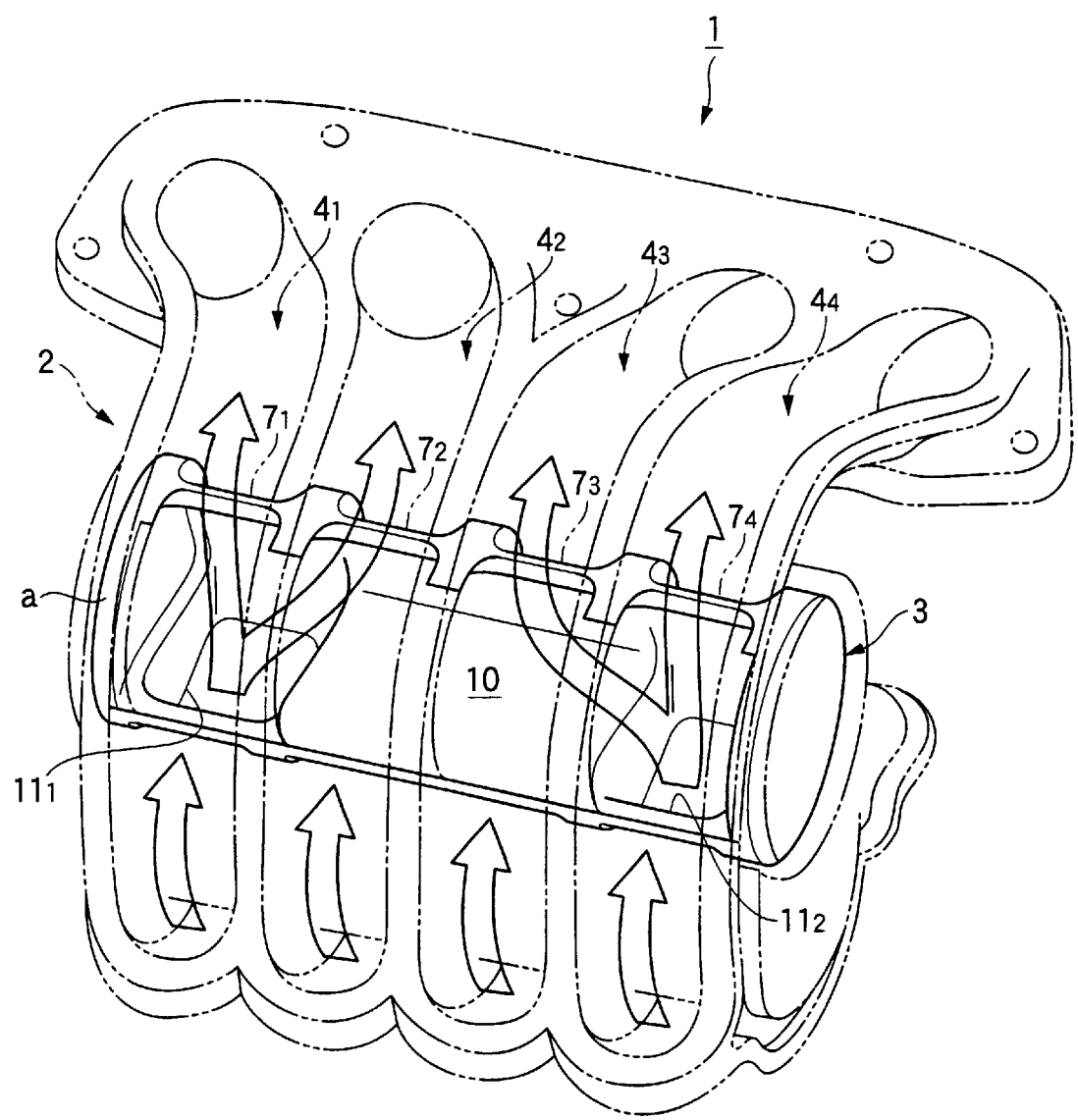
FIG. 5 is a view similar to FIG. 1, which shows the status of the rotary valve when the internal combustion engine is in a high engine speed range thereof in conjunction with the status of intake air flowing through the air intake passages in that range.
Figure 6:
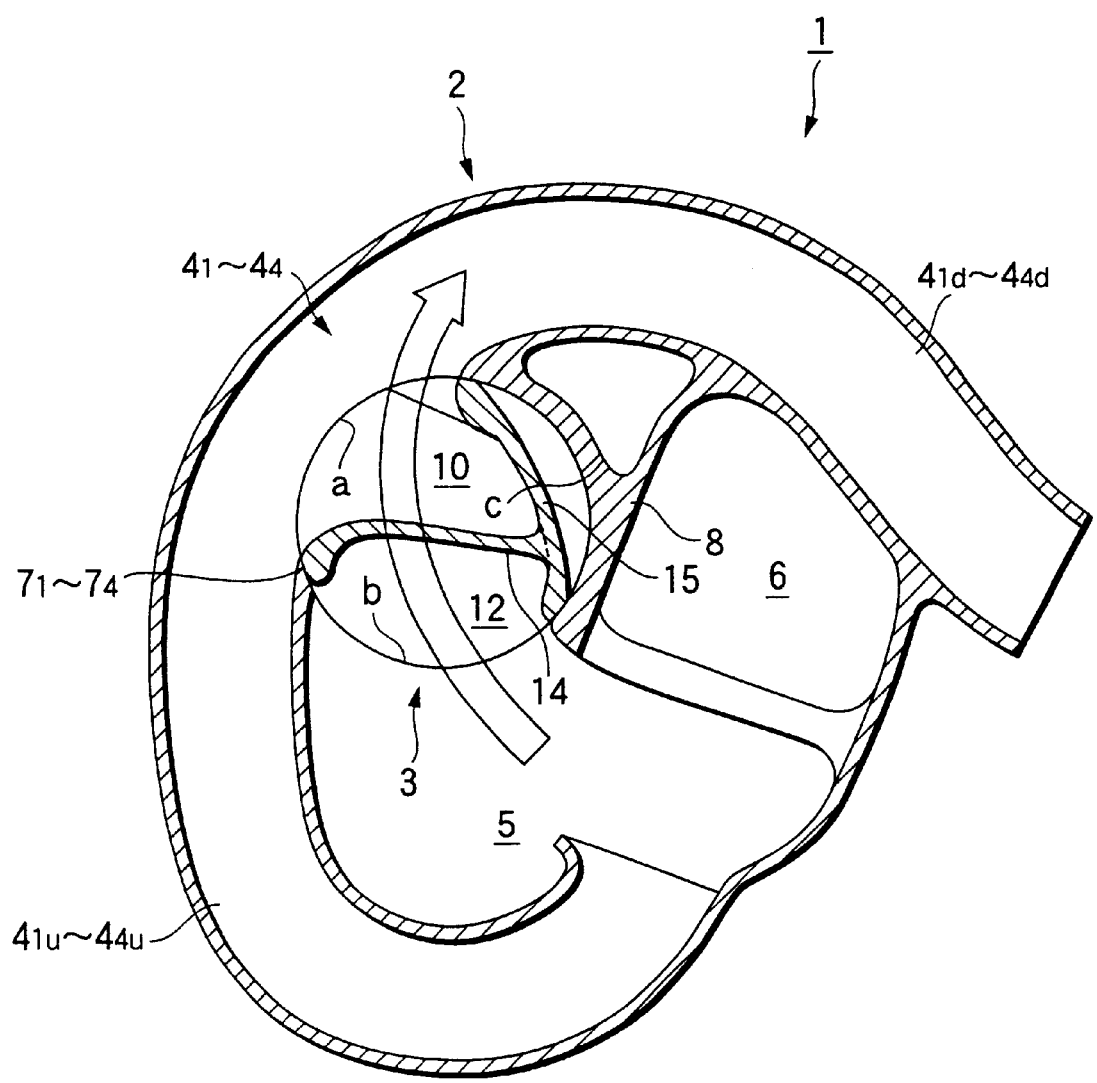
FIG. 6 is a view similar to FIG. 2, which shows a cross-sectional view of the variable intake apparatus shown in FIG. 5.
Figure 7:
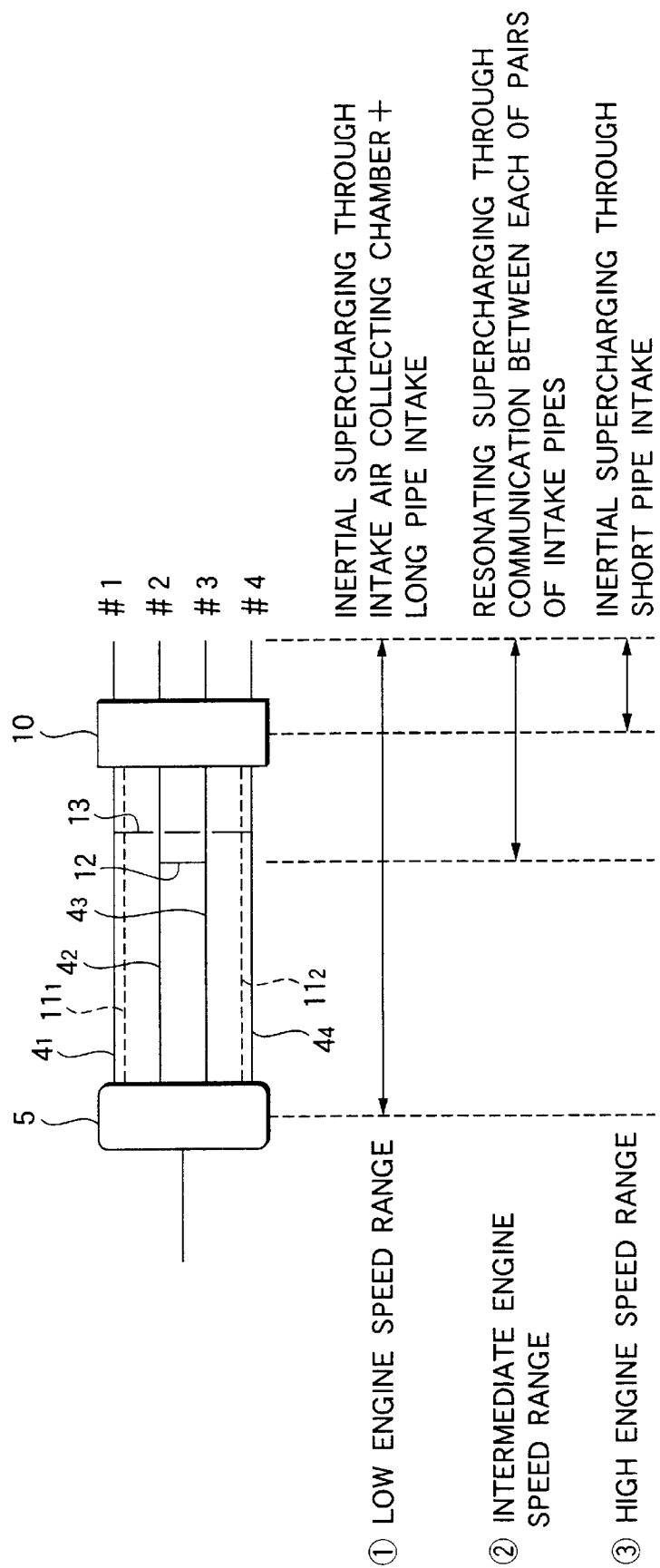
FIG. 7 is a diagram explaining an operation of the variable intake apparatus shown in FIG. 1.

Provided in the imaginary surface a side, which is one of the three imaginary surfaces a, b, c of the rotary valve 3 is the first communicating chamber 10 which can establish a communication between the adjacent air intake passages $4_1$ and $4_4$, $4_4$ and $4_2$, and $4_2$ and $4_3$, as shown in FIG. 5 and FIG. 6. As shown in FIG. 3, the first communicating chamber 10 communicates with the communicating ports $11_1$, $11_2$ formed so as to coincide with the first and fourth openings $7_1$, $7_4$ of the first and fourth air intake passages on another side b of the three imaginary surfaces, and therefore, when the rotary valve 3 is located at a rotational position as shown in FIGS. 5 and 6, intake air inside the intake air collecting chamber 5 flows across the interior of the rotary valve 3 and in a direction parallel with the axis thereof via the first communicating chamber 10, the two communicating ports $11_1$, $11_2$ (these communicating ports facing the intake air collecting chamber 5) and then flows into the first to fourth air intake passages $4_1$ to $4_4$, respectively, whereby the respective air intake passages $4_1$ to $4_4$ and the intake air collecting chamber 5 are caused to communicate with each other in a shortcut fashion.

Figure 4:
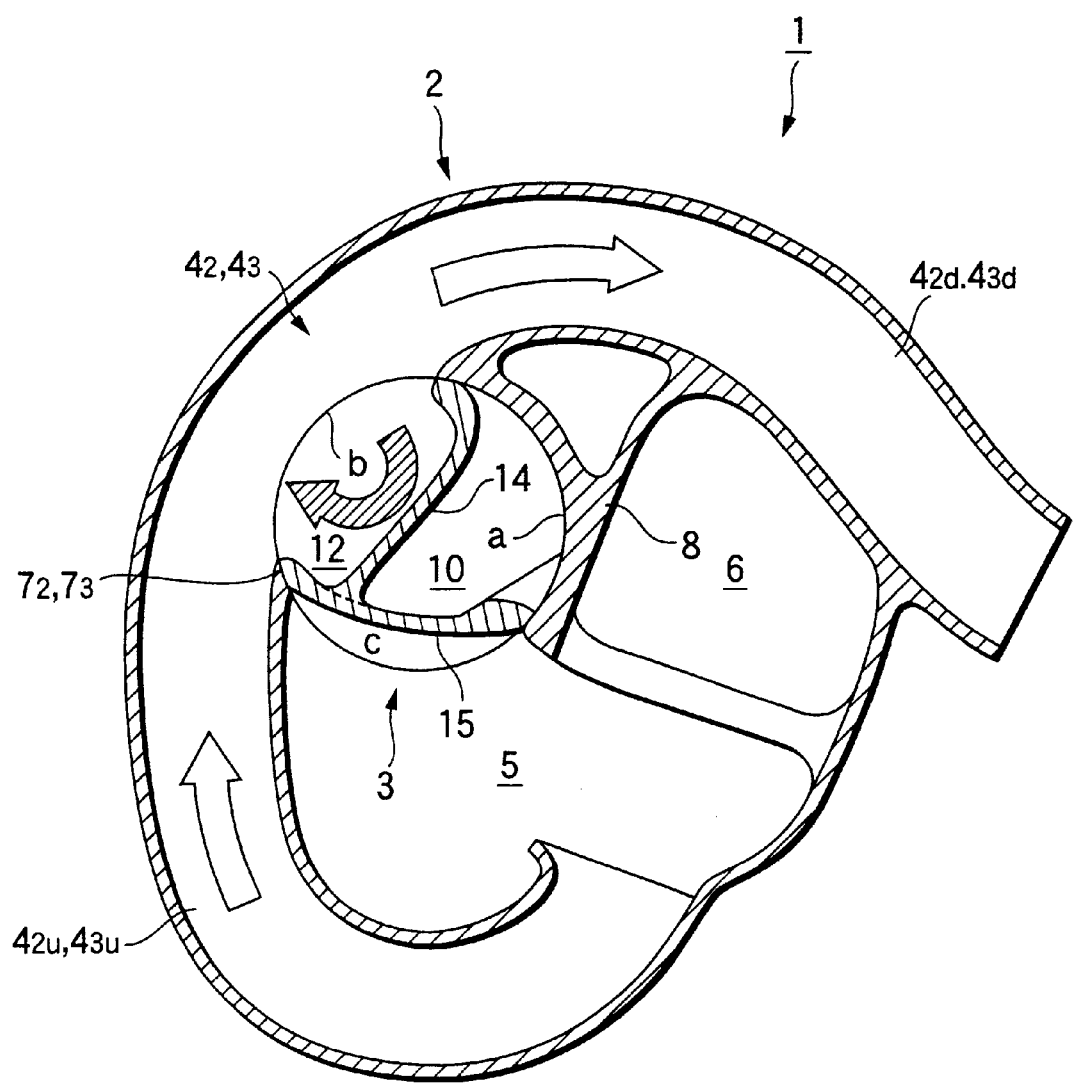
FIG. 4 is a view similar to FIG. 2, which is a cross-sectional view of the variable intake apparatus shown in FIG. 3.

As shown in FIGS. 3 and 4, provided in the imaginary surface b side, which is another of the three imaginary surfaces a, b, c of the rotary valve 3, for the two pairs of the air intake passages are second communicating chambers which can establish communications, respectively, between the pair of adjacent first and fourth air intake passages $4_1$, $4_4$ connecting to and communicating with the respective cylinders of the pair of cylinders Nos. 1 and 4 which does not have successive intake strokes at one ends thereof and the pair of adjacent second and third air intake passages $4_2$, $4_3$ connecting to and communicating with the respective cylinders of the pair of cylinders Nos. 2 and 3 which does not have successive intake strokes at one ends thereof.

One of the two communicating chambers is the communicating chamber 12 for establishing a communication between the pair of second and third air intake passages $4_2$, $4_3$ which are adjacent to each other, and the other is the communicating chamber 13 for establishing a communication between the pair of first and fourth air intake passages $4_1$, $4_4$ which are spaced away from each other. The latter communicating chamber 13 overlaps the aforesaid first communicating chamber 10. This first communicating chamber 10 is closed with the main body wall portion 8 of the intake manifold 2 when the rotary valve 3 is located at a rotational position as shown in FIGS. 3 and 4, but the first communicating chamber 10 remains open to the first and fourth air intake chambers $4_1$, $4_4$ via the first and fourth openings $7_1$, $7_4$ only at end portions communicating with the communicating ports $11_1$, $11_2$. Thus, the main body wall portion 8 of the intake manifold 2 closes the rotary valve 3 over substantially one third of the outer circumference thereof in an arc-like fashion.

The communicating chamber 12, which is the one of the second communicating chambers, is surrounded and formed by a partition wall (a third partition wall) 14 for constituting a partition between the surface a, which is one of the three imaginary surfaces, and the surface b, which is another of the three imaginary surfaces, over a length extending between the second and third air intake passages $4_2$, $4_3$, a partition wall (a first partition wall) 15 for constituting a partition between the surfaces a and b, and the surface c, which is the other surface of the imaginary surfaces over the full length of the rotary valve 3, a partition wall (a first fourth partition wall) 16 for constituting a partition between first and second air intake passages $4_1$, $4_2$ and a partition wall (a second forth partition wall) 17 for constituting a partition between the third and fourth air intake passages $4_3$, $4_4$. The partition wall (the third partition wall) 14 is formed into a configuration which is depressed inwardly of the rotary valve 3 such that cross-sectional areas of the communicating chamber 12 becomes equal to those of the second and third air intake passages $4_2$, $4_3$.

As shown in FIGS. 1 and 2, provided in the imaginary surface c, which is the other of the three imaginary surfaces a, b, c of the rotary valve 3, are partition walls (second partition walls 1 to 3) adapted to block off a communication between the adjacent air intake passages $4_1$ and $4_4$, $4_4$ and $4_2$, and $4_2$ and $4_3$. These partition walls consist of crescent-shaped partition walls (second partition walls 1 to 3) 18 to 20 adapted to function as partitions between the air intake passages and the aforesaid partition wall (the first partition wall) 15. Then, when the rotary valve 3 is located in a rotational position as shown in FIGS. 1 and 2, the partition walls block off a communication between the adjacent air intake passages $4_1$ and $4_4$, $4_4$ and $4_2$, and $4_2$ and $4_3$, respectively, so as to provide four independent passages constituting the long air intake passages $4_1$ to $4_4$ which are perfectly independent from one another.

The partition wall 15 is curved so as to protrude into the respective air intake passages $4_1$ to $4_4$ in such a manner as not to change the sectional configuration of the respective air intake passages $4_1$ to $4_4$ along the longitudinal direction of the passages and is also curved so as to be depressed slightly towards the interior of the rotary valve 3 so that the cross-sectional configurations of the respective air intake passages $4_1$ to $4_4$ along a direction normal to the longitudinal direction thereof are not changed.

The first to fourth partition walls 14 to 20 and the first and second communicating chambers 10, 12, 13 will be described in greater detail.

The first partition wall 15 extends between two vortexes of an equilateral triangle obtained by dividing at equal intervals the outer circumference of the rotary valve 3 into three and has a length corresponding to the length over which the four air intake passages $4_1$ to $4_4$ which are independent from each other are arranged sideways in line with each other. The three second partition walls 18 to 20 are provided on the first partition wall 15 contiguously therewith so as to cut off a communication between the adjacent air intake passages $4_1$ and $4_4$, $4_4$ and $4_2$, and $4_2$ and $4_3$. The third partition wall 14 extends between the remaining vortex of the equilateral triangle and a point in the vicinity of one of side edges (an upper side edge as viewed in FIG. 2) of the first partition wall 15 and has a length corresponding to the length over which the two central air intake passages $4_2$ to $4_3$ which are independent from each other are arranged sideways in line with each other. The two fourth partition walls 16, 17 are provided along left and right side edges in such a manner as to be contiguous therewith and block off a communication between the left-side pair of adjacent air intake passages $4_1, 4_2$ and between the right-side pair of adjacent air intake passages $4_3$, $4_4$. Since the first communicating chamber 10 and the connecting chamber 13, which is the other of the two second communicating chambers, overlaps each other, the rotary valve 3 is to have two communicating chambers which are the communicating chamber 10 and the communicating chamber 12.

The rotary valve 3 comprises a control means for switching over the rotary valve in triple stages in response to the rotational speed of the internal combustion engine such that any of the three imaginary surfaces a, b, c faces the first to fourth openings $7_1$ to $7_4$ in the first to fourth air intake passages $4_1$ to $4_4$. Electric or negative pressure actuators (not shown) are employed in the control means.

The actuators are disposed on the intake apparatus 1 at one end of the rotary valve 3. The rotary valve 3 is constructed so as to operate sequentially in stages in response to the rotational speed of the internal combustion engine and rotates clockwise and counterclockwise in response to fluctuations in rotational speed of the internal combustion engine. With electric actuators being used, an electric motor may only have to be actuated in stages by signals from the control means. With negative pressure actuators being used, a diaphragm provided with at least two negative pressure chambers is needed, and a control valve is provided in each of the negative pressure chambers. The rotary valve 3 can operate in stages by actuating the control valves sequentially in response to the rotational speed of the internal combustion engine for introduction of negative pressures. This introduction of negative pressures (instruction) is carried out by the control means, and negative pressures are introduced from a downstream of the throttle valve for distribution to the respective control valves via negative chambers.

The control means controls and switches over the rotary valve 3 as will be described below in response to the rotational speed of the internal combustion engine.

First, in the event that the internal combustion engine is in its low engine speed range in which the rotational speed N of the engine is lower than a predetermined rotational speed $N_1$ ($N<N_1$), the control means controls and switches over the rotary valve 3 such that the other imaginary surface c of the three imaginary surfaces a, b, c of the rotary valve 3 faces the first to fourth openings $7_1$ to $7_4$ in the first to fourth air intake passages $4_1$ to $4_4$, whereby communications between all the adjacent air intake passages $4_1$ and $4_4$, $4_4$ and $4_2$, and $4_2$ and $4_3$ are blocked off by the partition wall 15 and the partition walls 18 to 20 to thereby form the first to fourth air intake passages which are long and perfectly independent from one another.

Then, intake air inside the intake air collecting chamber 5 flows into and through the first to fourth long air intake passages $4_1$ to $4_4$ for supply into the respective cylinders Nos. 1 to 4. When this occurs, the intake air collecting chamber 5 functions as a portion open to the atmosphere, which becomes a chamber where intake pressure wave pulses are reversed, whereby the intake pressure wave pulse having a low natural frequency inside the long air intake passages $4_1$ to $4_4$ and a long opening and closing cycle of the intake valves based on the low engine speed of the internal combustion engine are tuned to each other to thereby obtain a high inertial supercharging effect, whereby a high intake air charging efficiency can be obtained for each of the cylinders, thus making it possible to improve the output torque of the internal combustion engine (refer to $\hat{1}$ in FIGS. 7 and 8 ).

In this case, since the surface a, which is the one of the three imaginary surfaces a, b, c, faces the intake air collecting chamber 5, the volume of the communicating chamber 10 provided on the surface a adds to the volume of the intake air collecting chamber 5, whereby the volume of the intake air collecting chamber 5 is increased, and hence the intake air pressure pulse reversing function of the same chamber increases further, this promoting further the effect described above.

Next, in the event that the internal combustion engine is in its intermediate engine speed range in which the rotational speed of the internal combustion engine is greater than $N_1$ but is lower than a predetermined rotational speed $N_2$ ($N_1 < N_2$), ($N_1 < N < N_2$), as shown in FIGS. 3 and 4, the control means controls and switches over the rotary valve 3 such that another imaginary surface b of the three imaginary surfaces a, b, c of the rotary valve 3 faces the first to fourth openings $7_1$ to $7_4$ in the first to fourth air intake passages $4_1$ to $4_4$, whereby a communication is established between the pair of first and fourth air intake passages $4_1$, $4_4$ connecting to and communicating with the respective cylinders of the pair of cylinders Nos. 1 and 4 which does not have successive intake strokes at one ends thereof and between the pair of second and third air intake passages $4_2$, $4_3$ connecting to and communicating with the respective cylinders of the pair of cylinders Nos. 2 and 3 which does not have successive intake strokes at one ends thereof via the communicating chambers 12, and the communicating chamber 13, respectively.

Then, the respective pairs of air intake passage portions $4_{1u}$, $4_{2u}$ and $4_{2u}$, $4_{3u}$ upstream of the respective communicating portions (the communicating chamber 12, the communicating chamber 13) between the pair of the first and fourth air intake passages $4_1$, $4_4$ and the pair of the second and third air intake passages $4_2$, $4_3$ constitute a resonating system for each pair of cylinders, and the intake pressure waves can be propagated through the respective air intake passages $4_1$ to $4_4$ and the respective communicating portions (the communicating chamber 12, the communicating chamber 13) without reversing therein for use for the following intake stroke in the other cylinder of the same pair, whereby a high resonating supercharging effect can be obtained, and a high intake air charging efficiency can be obtained for the respective cylinders of the pairs of cylinders Nos. 1, 4 and 2, 3 which do not have successive intake strokes, thereby making it possible to improve the output torque of the internal combustion engine. Thus, it is possible to compensate for drops in intake air charging efficiency and output torque which would result in an intermediate portion between the low engine speed range and the high engine speed range (refer to $\hat{2}$ in FIGS. 7 and 8).

In this case, another surface c of the three imaginary surfaces a, b, c of the rotary valve 3 faces the intake air collecting chamber 5, and the partition wall 15 provided thereon blocks off a communication between the respective air intake chambers $4_1$ to $4_4$ and the intake air collecting chamber 5. Thus, since the partition wall 15 is used as both a constituent member of the partition wall blocking off a communication between the adjacent air intake passages $4_1$ and $4_2$, $4_2$ and $4_3$, $4_3$ and $4_4$, respectively, and a partition wall blocking off a communication between the respective air intake passages $4_1$ to $4_4$ and the intake air collecting chamber 5, the internal construction of the rotary valve 3 can be simplified.

Furthermore, in the event that the internal combustion engine is in its high engine speed range ($N_2 < N$) in which the rotational speed of the engine is higher than $N_2$, as shown in FIGS. 5 and 6, the control means controls and switches over the rotary valve 3 such that the surface a, which is the one of the three imaginary surfaces a, b, c of the rotary valve 3, faces the first to fourth openings $7_1$ to $7_4$ in the first to fourth air intake passages $4_1$ to $4_4$, whereby communications are established between all the adjacent air intake passages $4_1$ and $4_4$, $4_4$ and $4_2$, and $4_2$ and $4_3$, and the respective air intake passages $4_1$ to $4_4$ and the intake air collecting chamber 5 are caused to communicate with each other in a shortcut fashion via the first communicating chamber 10 and the two communicating ports $11_1$, $11_2$.

Then, intake air inside the intake air collecting chamber. 5 flows into the first to fourth air intake passages $4_1$ to $4_4$ via the two communicating ports $11_1$, $11_2$, the first communicating chamber 10 and the first to fourth openings $7_1$ to $7_4$, then flows through the short air intake passage portions $4_{1d}$ to $4_{4d}$ downstream of the first communicating chamber 10 and is supplied into the respective cylinders Nos. 1 to 4. When this occurs, since the first communicating chamber 10 which is formed so as to have a large volume is made to open to the intake air collecting chamber 5, the chamber functions as a portion which is open to the atmosphere and becomes the reverse chamber for intake air pressure wave pulses, whereby the intake pressure wave pulse having a high natural frequency inside the short air intake passage portions $4_{1d}$ to $4_{4d}$ extending from the combustion chambers to the communicating chamber 10 and the short opening and closing cycle of the intake valves based on the high rotational speed of the engine are tuned to each other to thereby obtain a high inertial supercharging effect, and a high intake air charging efficiency is obtained for all the cylinders, thereby making it possible to improve the output torque of the engine (refer to $\hat{3}$ in FIGS. 7 and 8).

Thus, the flat and high intake air charging efficiency and high output torque can be obtained over a wide range of engine speeds from the low engine speed range to the high engine speed range. In general, when comparing the inertial supercharging effect with the resonating supercharging effect, the inertial one can exhibit a larger effect, and therefore, the resonating supercharging effect is regarded as one for assisting the inertial supercharging effect. According to the embodiment of the invention, however, as has been described heretofore, the drop in intake air charging efficiency at the intermediate portion between the high intake air charging efficiency based on the inertial supercharging effect obtained in the low engine speed range and the high intake air charging efficiency based on the inertial supercharging effect obtained in the high engine speed range is compensated for sufficiently by the improvement in intake air charging efficiency based on the inertial supercharging effect obtained in the intermediate engine speed range.

Since the first embodiment of the invention is constructed as has been described heretofore, the following advantages can further be provided.

Since the four air intake passages $4_1$ to $4_4$ which are independent from each other and which connect to and communicate with the respective cylinders of the in-line four-cylinder internal combustion engine, respectively, at one ends thereof and the single intake air collecting chamber at the other ends thereof are arranged sideways in line with each other, the respective air intake passages $4_1$ to $4_4$ in no case intersect with one another, and the intake apparatus (the intake manifold) 1 can be formed compact in the direction in which the cylinders are arranged, this providing a good space efficiency. In addition, the equalization of the lengths of the respective air intake passages can be eased.

In addition, at the high engine speed range, since the respective air intake passages $4_1$ to $4_4$ and the intake air collecting chamber 5 are caused to communicate with each other in a shortcut fashion via the rotary valve 3, even if the respective air intake passage portions (long air intake passage portions) $4_{1u}$ to $4_{4u}$ upstream of the communicating chamber 10 between the adjacent air intake passages $4_1$ and $4_2$, $4_2$ and $4_3$, $4_3$ and $4_4$ are made thinner, and the low engine speed range is shifted down towards a lower engine speed side, an intake air flow rate which is required at the high engine speed range can be acquired sufficiently, whereby the intake apparatus 1 can be formed more compact.

Moreover, since the high intake air charging efficiency and the high output torque can be obtained over the wide engine speed range which ranges from the low engine speed area to the high engine speed area by controlling to switch over the rotary valve 3 provided between the intermediate portion along the length of the four air intake passages $4_1$ to $4_4$ which are independent from each other and the intake air collecting chamber 5 in such a manner as to switch it over in triple stages at regular intervals in response to the rotational speed of the internal combustion engine, the number of components such as valves and actuators can be reduced, whereby the production costs can be reduced, the construction and weight of the apparatus can be simplified and reduced, respectively. This eases the provision of the variable intake apparatus 1 for an in-line four-cylinder internal combustion engine which requires less space for installation thereof. In addition, since with the rotary valve 3, the valve body and the shaft portion thereof do not protrude into the air intake passages $4_1$ to $4_4$, there is no risk of the intake resistance being increased.

Additionally, since the first to fourth air intake passages $4_1$ to $4_4$ are curved and formed round, and since the intake air collecting chamber 5 and the air intake duct 6 are provided in the internal space in the curvature of the air intake passages $4_1$ to $4_4$ formed round in such a manner as to be embraced thereby, the intake apparatus 1 can be formed compact also from this aspect.

Furthermore, since the rotary valve is operated to be switched over by an electric or negative pressure actuator, it becomes easy to construct the control means for controlling the rotary valve so as to be switched over in triple stages at equal intervals in response to the rotational speed of the internal combustion engine.

Furthermore, the rotary valve 3 has three imaginary surfaces a, b, c which are partitioned circumferentially at equal intervals as viewed from the side in an axial direction of the valve, and the three imaginary surfaces a, b, c are adapted to be circumferentially switched over in triple stages in response to the rotational speed of the internal combustion engine, whereby a communication is established or cut off between the air intake passages $4_1$ and $4_2$, $4_2$ and $4_3$, $4_3$ and $4_4$ which are adjacent to each other or between each of the pair of first and fourth air intake passages $4_1$, $4_4$ and the pair of second and third air intake passages $4_2$, $4_3$ which connect to and communicate with the respective cylinders of the pairs of cylinders which do not have successive intake strokes at the one ends thereof, while a communication is established in a shortcut fashion or cut off between the respective air intake passages $4_1$ to $4_4$ and the intake air collecting chamber 5.

As a result, the construction for switching the rotary valve over in triple stages can be simplified, and the constructions for implementing variable intake operations may only have to be provided on the respective sides of the three imaginary surfaces a, b, c. Therefore, the internal construction of the rotary valve can be formed relatively simply, whereby there is no need to provide an exclusive passage for establishing a communication in a shortcut fashion between the respective air passages $4_1$ to $4_4$ and the intake air collecting chamber 5 at the high engine speed range, this helping further make the intake apparatus 1 compact.

Note that the constructions of the first communicating chamber 10, the second communicating chamber (the communicating chambers 12, 13) and the partition walls 14, 15 are not limited to those described with respect to the first embodiment of the invention but may be modified in various ways.

<Second Embodiment>

Next, a description will be given of a second embodiment of the variable intake apparatus with reference to FIGS. 8 to 15.

Figure 9:
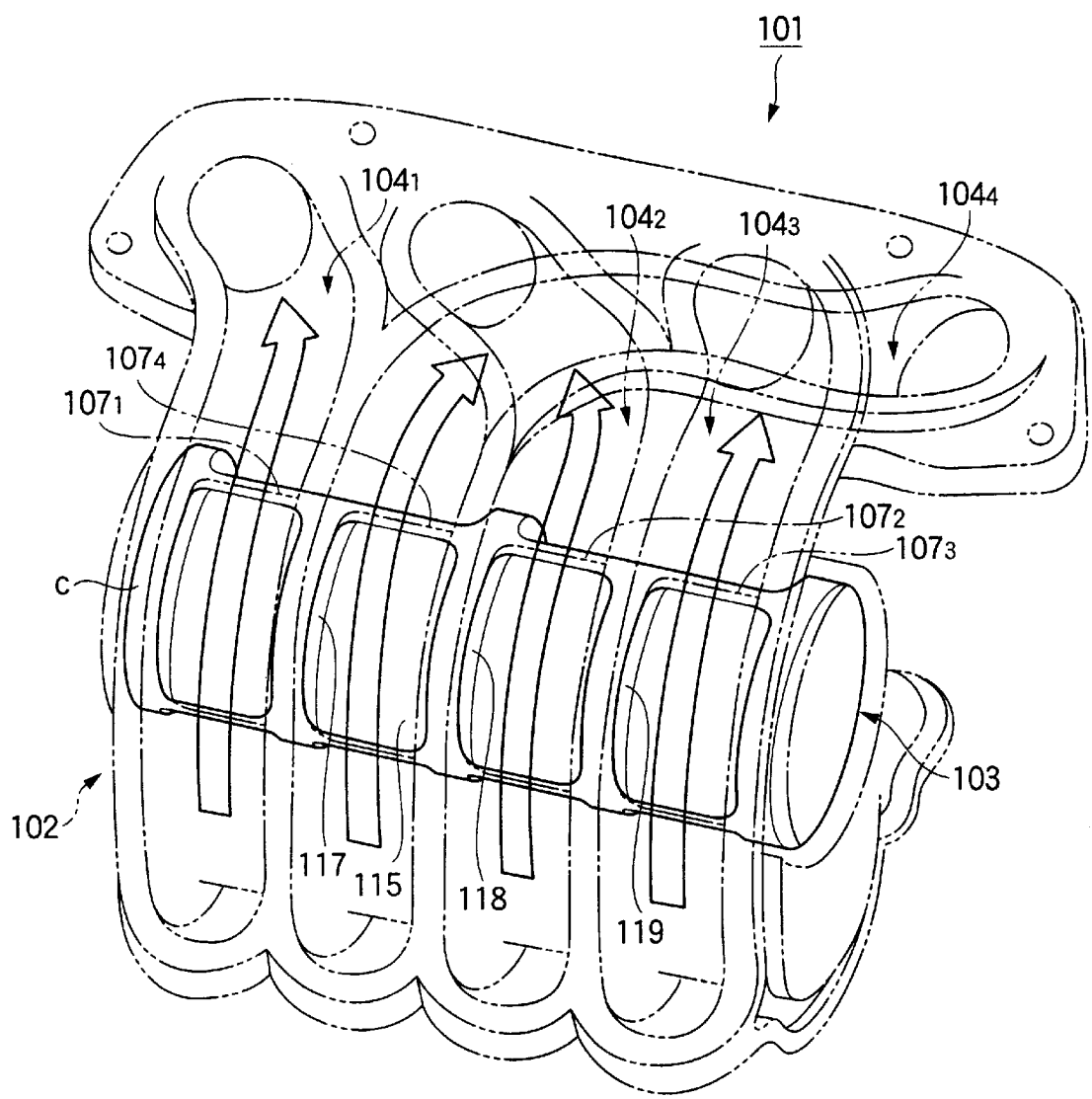
FIG. 9 is a schematic perspective view of a variable intake apparatus for an in-line four-cylinder internal combustion engine according to a second embodiment of the invention, showing an imaginary view of the apparatus as viewed by cutting away an upper half of an air intake passage portion along air intake passages in which the status of a rotary valve when the internal combustion engine is in a low engine speed range thereof is illustrated in conjunction with the status of intake air flowing through the air intake passages in that range.
Figure 10:
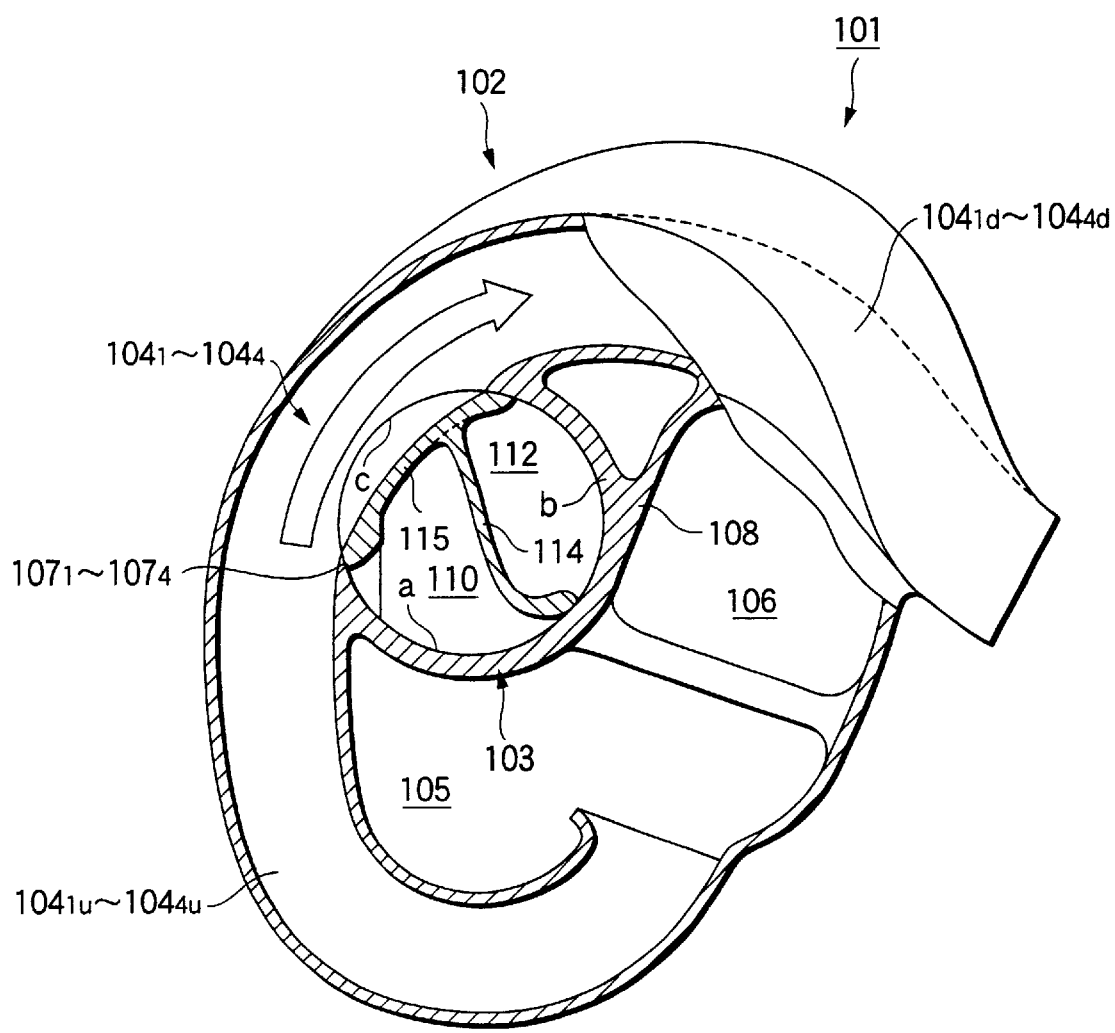
FIG. 10 is a cross-sectional view of the variable intake apparatus of FIG. 9, showing the complete air intake passages.

In FIGS. 9 and 10, a variable intake apparatus 101 for an in-line four-cylinder internal combustion engine according to the invention comprises an intake manifold 102 having juxtaposed first to fourth four air intake passages $104_1$ to $104_4$ which are independent from one another and which connect, respectively, to cylinders Nos. 1 to 4 (not shown) of the internal combustion engine at one ends thereof and to a single intake air collecting chamber 105 at the other ends thereof.

The cylinders Nos. 1 to 4 are fired in the order of cylinder No. 1, cylinder No. 3, cylinder No. 4 and cylinder No. 2. Therefore, intake strokes in the respective cylinders take place in that order, and the cylinders Nos. 1 and 4 constitute a pair of cylinders which does not have successive intake strokes, whereas the cylinders Nos. 2 and 3 constitute a pair of cylinders which does not have successive intake strokes.

The air intake passages $104_1$ to $104_4$ are arranged sideways in line with each other in the direction in which the cylinders are arranged such that the air intake passages $104_1$, $104_4$ communicating with the cylinders Nos. 1 and 4 which do not have successive intake periods are located adjacent to each other as a pair, whereas the air intake passages $104_2$, $104_3$ communicating with the cylinders Nos. 2 and 3 which do not have successive intake strokes are located adjacent to each other as a pair except for an intersecting portion of the air intake passages which is in the vicinity of where the air intake passages connect to and communicate with the respective cylinders Nos. 1 to 4 of the engine at one ends thereof (in FIG. 9, a portion where an upper curved portion of the fourth air intake passage $104_4$ intersects with upper curved portions of the second and third air intake passages $104_2$, $104_3$). Therefore, the first and fourth air intake passages $104_1$, $104_4$ are adjacent to each other at a left half portion of the air intake passage portion as viewed in the direction in which the cylinders are arranged, whereas the second and third air intake passages $104_2$, $104_3$ are adjacent to each other at a right-half portion of the air intake passage portion as viewed in the cylinder arrangement direction.

According to the construction, the pairs of adjacent air intake passages connecting to and communicating with the pair of cylinders which does not have successive intake strokes are the pair of the adjacent first and fourth air intake passages $104_1$, $104_4$ connecting to and communicating with the respective cylinders of the pair of cylinders Nos. 1, 4 at one ends thereof and the pair of the adjacent second and third air intake passages $104_2$, $104_3$ connecting to and communicating with the respective cylinders of the pair of cylinders Nos. 2, 3 at one ends thereof.

As shown in FIG. 10, the first to fourth air intake passages $104_1$ to $104_4$ are made substantially equal in length and are curved so as to wind inwardly, and an intake air collecting chamber 105 is provided so as to connect to and communicate with distal ends of the air intake passages so wound. This intake air collecting chamber 105 together with an air intake duct 106 is provided so as to be embraced within an interior space resulting by virtue of the curvature of the curved first to fourth air intake passages $104_1$ to $104_4$ with an intention to make the variable intake apparatus 101.

Intake air led to the air intake duct 106 via an air cleaner and a throttle body which are both not shown then flows into the intake air collecting chamber 105 having a relatively large volume, where it is collected. When the internal combustion engine is in its low to intermediate engine speed range, the intake air then flowing out of the intake air collecting chamber 105 is divided so as to flow through the first to fourth air intake passages $104_1$ to $104_4$ which are relatively long passages into the cylinders Nos. 1 to 4 for intake thereinto. Although a communicating path between the intake duct 106 and the intake air collecting chamber 105 is not shown, the communicating path is provided at a central portion along the length of the intake air collecting chamber 105, whereby the length of the air intake passages including the first to fourth air intake passages $104_1$ to $104_4$ which leads from the intake air collecting chamber 105 to the respective cylinders Nos. 1 to 4 is made to be equal.

First to fourth openings $107_1$ to $107_4$ each having a substantially rectangular shape when viewed from the front are formed, respectively, in bottom walls of the first to fourth air intake passages $104_1$ to $104_4$ at intermediate positions along the lengths thereof, and a single-unit rotary valve 103 is provided such that part thereof protrudes, respectively, into the first to fourth air intake passages through the first to fourth openings $107_1$ to $107_4$. The portion of the rotary valve which protrudes into the first to fourth air intake passages $104_1$ to $104_4$ corresponds to a crescent-like portion, as viewed from an axis of the rotary valve 103, which would result when an arc extending over substantially one third the circumference of the rotary valve is cut away (refer to FIG. 10).

The rotary valve 103 is disposed such that the remaining portion of the valve is embraced by a main body wall portion 108, which remaining portion excludes the aforesaid arc portion extending over one third the circumferential length of the same valve as viewed from the side and protruding respectively into the first to fourth air intake passages $104_1$ to $104_4$. The main body wall portion 108 is formed into an arc extending substantially over two third the circumference of the rotary valve 103 as viewed from the side and functions to close first and second communicating chambers 110, 112 which will be described later in response to the rotational position of the rotary valve 103. Substantially half the main body wall portion 108 also constitutes a part of the wall of the intake air collecting chamber 105.

Next, the construction, operation and effectiveness of the rotary valve 103 will be described.

As shown in FIG. 10, the rotary valve 103 has three imaginary surfaces a, b, c which are partitioned at equal intervals in the circumferential direction as viewed from the side in an axial direction of the valve, and as will be described in detail below, it is constructed such that a communication is established or blocked off between the adjacent air intake passages $104_1$ and $104_4$, $104_4$ and $104_2$, and $104_2$ and $104_3$ or between the pair of adjacent first and fourth air intake passages $104_1$, $104_4$ which connect to and communicate with the respective cylinders of the pair of cylinders which does not have successive intake strokes and also between the pair of adjacent second and third air intake passages $104_2$, $104_3$ which connect to and communicate with the respective cylinders of the pair of cylinders which does not have successive intake strokes by switching over the three imaginary surfaces a, b, c in triple stages in the circumferential direction in response to the rotational speed of the internal combustion engine.

Figure 13:
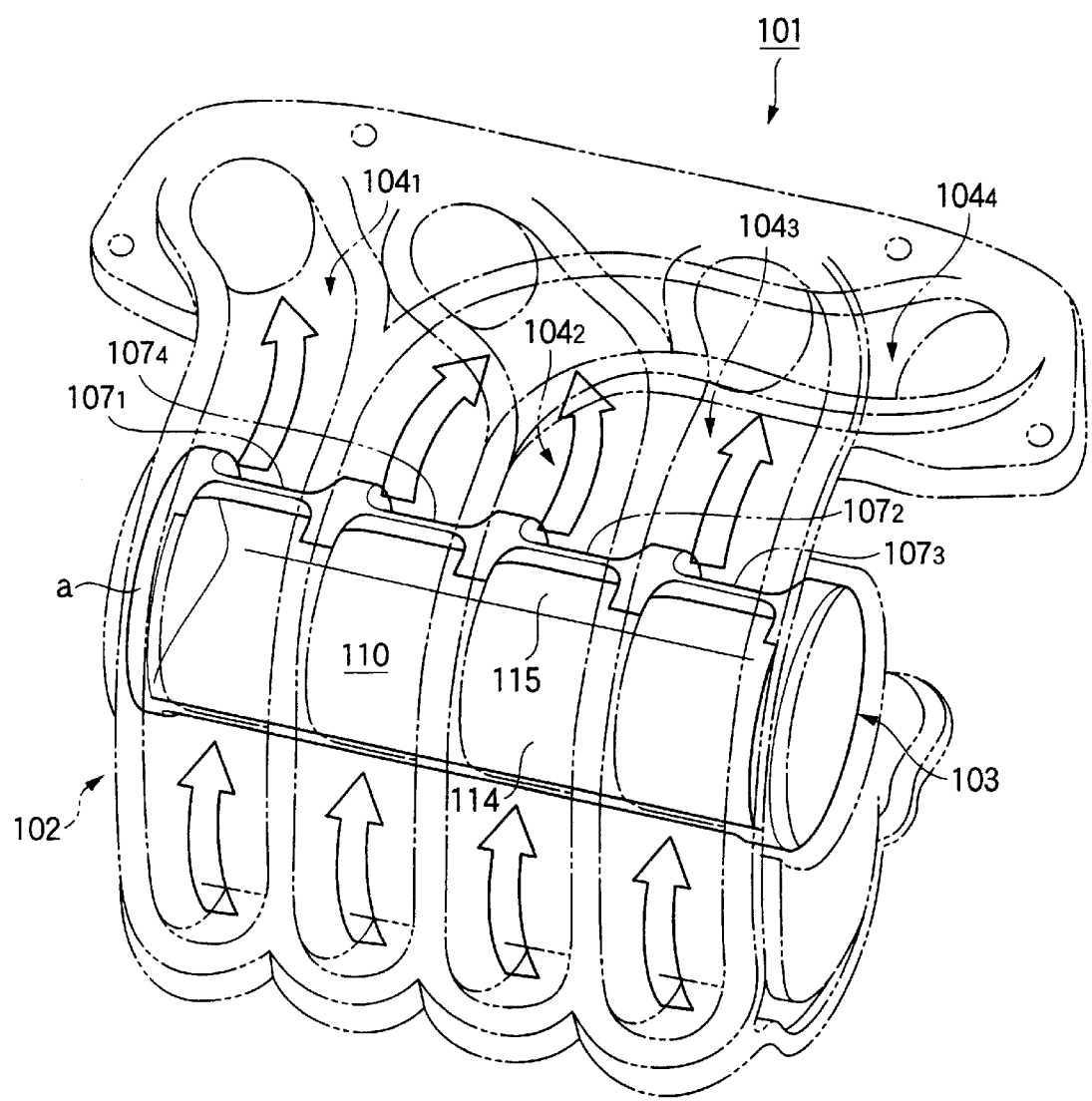
FIG. 13 is a view similar to FIG. 9, which shows the status of the rotary valve when the internal combustion engine is in a high engine speed range thereof in conjunction with the status of intake air flowing through the air intake passages in that range.
Figure 14:
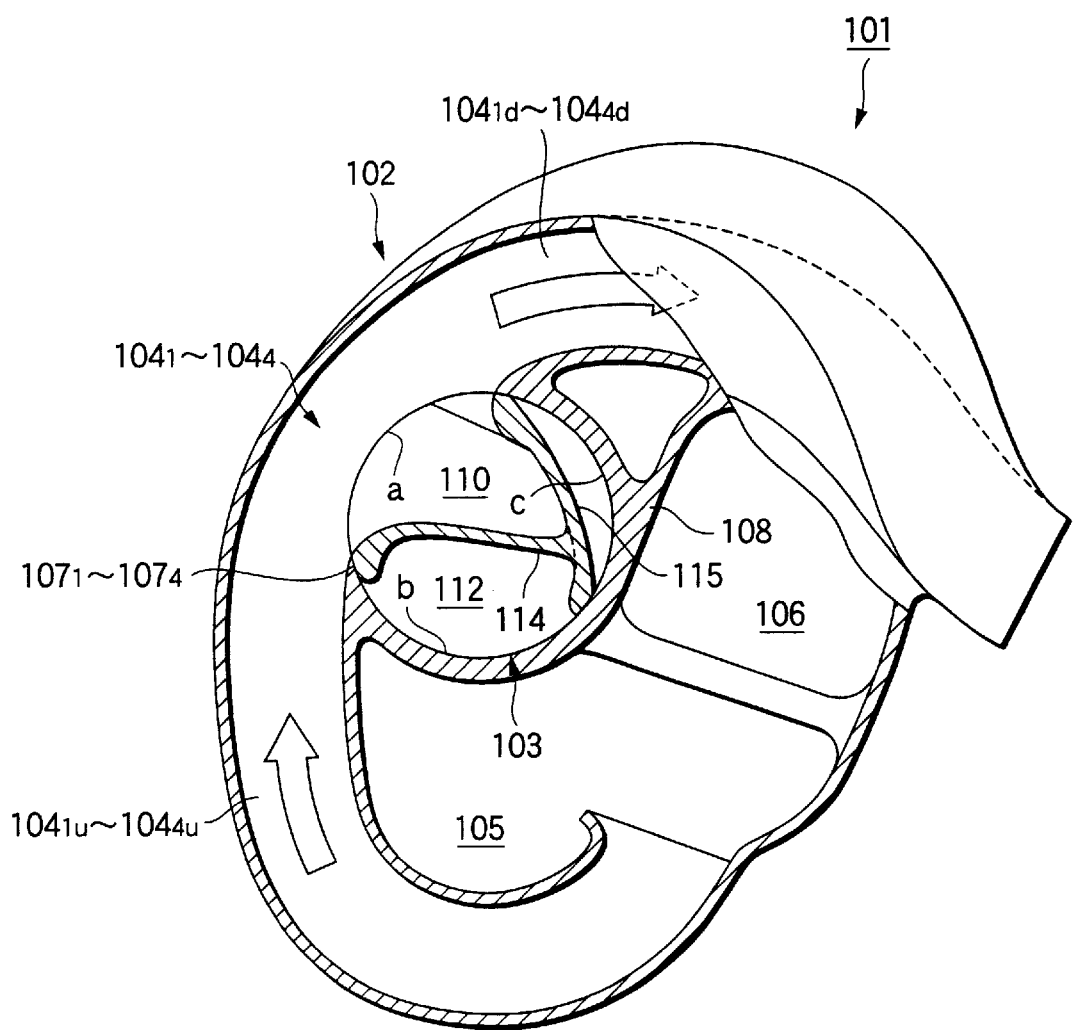
FIG. 14 is a view similar to FIG. 10, which shows a cross-sectional view of the variable intake apparatus shown in FIG. 13.

Provided in the imaginary surface a side, which is one of the three imaginary surfaces a, b, c of the rotary valve 103 is a first communicating chamber 110 having a large volume which can establish a communication between the adjacent air intake passages $104_1$ and $104_4$, $104_4$ and $104_2$, and $104_2$ and $104_3$, as shown in FIGS. 13 and 14.

This first communicating chamber 110 is partitioned by a partition wall (a third partition wall) 114 adapted to function as a partition between the imaginary surface a side and the imaginary surface b side along the full length of the rotary valve 103 and a partition wall (a first partition wall) 115 adapted to function as partition between the imaginary surface a side and the imaginary surface b side and between the imaginary surface b side and the imaginary surface c side along the full length of the rotary valve 103, is formed so as to be depressed towards the interior of the rotary valve 103, has a cross-sectional area which is greater than respective cross-sectional areas of the first to fourth air intake passages $104_1$ to $104_4$ and the cross-sectional area of a second communicating chamber 112 which will be described later, and is adapted to establish a communication through all the air intake passages while drastically varying the respective cross-sectional shapes of the first to fourth air intake passages $104_1$ to $104_4$.

Figure 11:
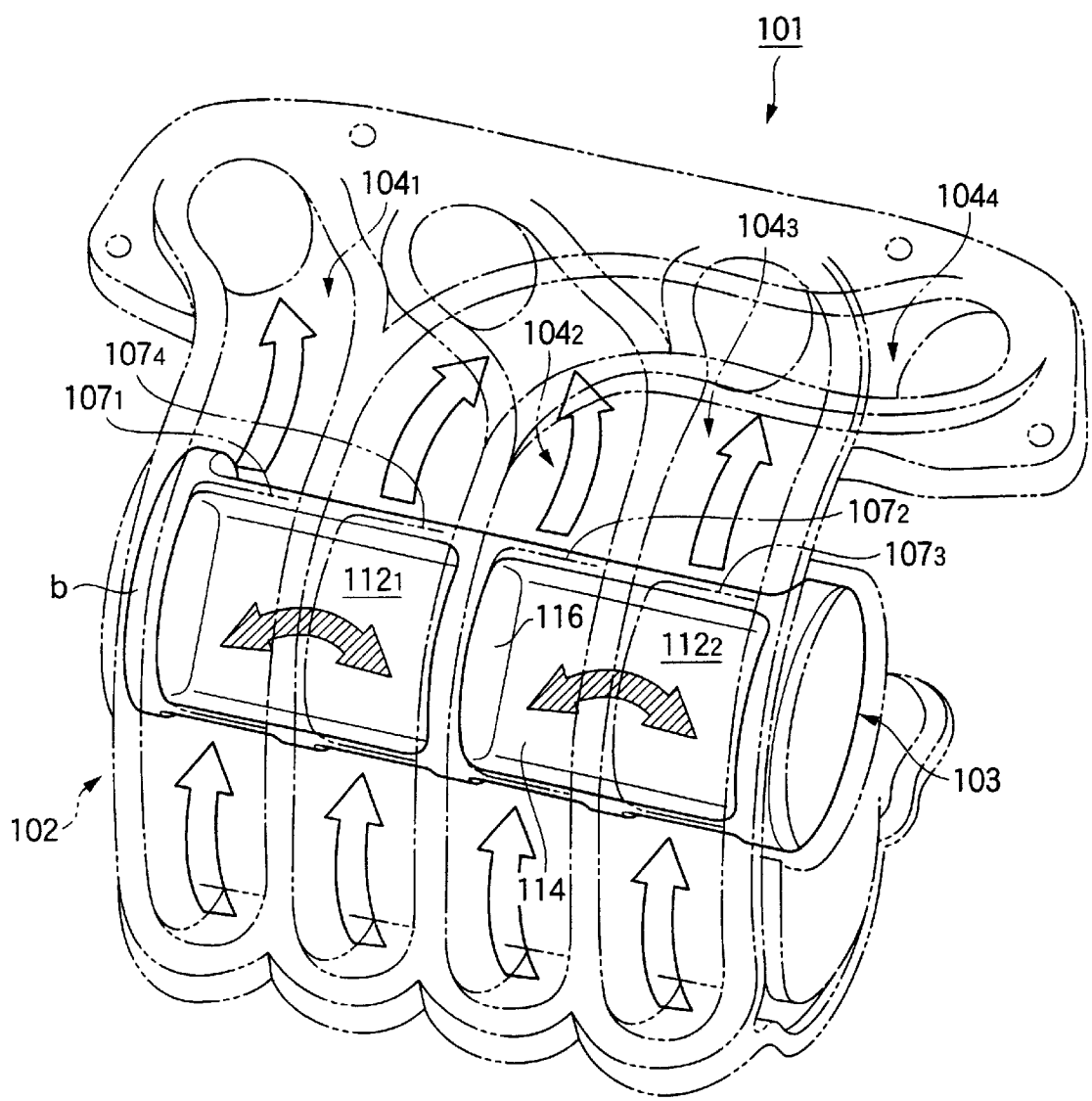
FIG. 11 is a view similar to FIG. 9, showing the status of the rotary valve when the internal combustion engine is in an intermediate engine speed range thereof in conjunction with the status of intake air flowing through the air intake passages in that range.
Figure 12:
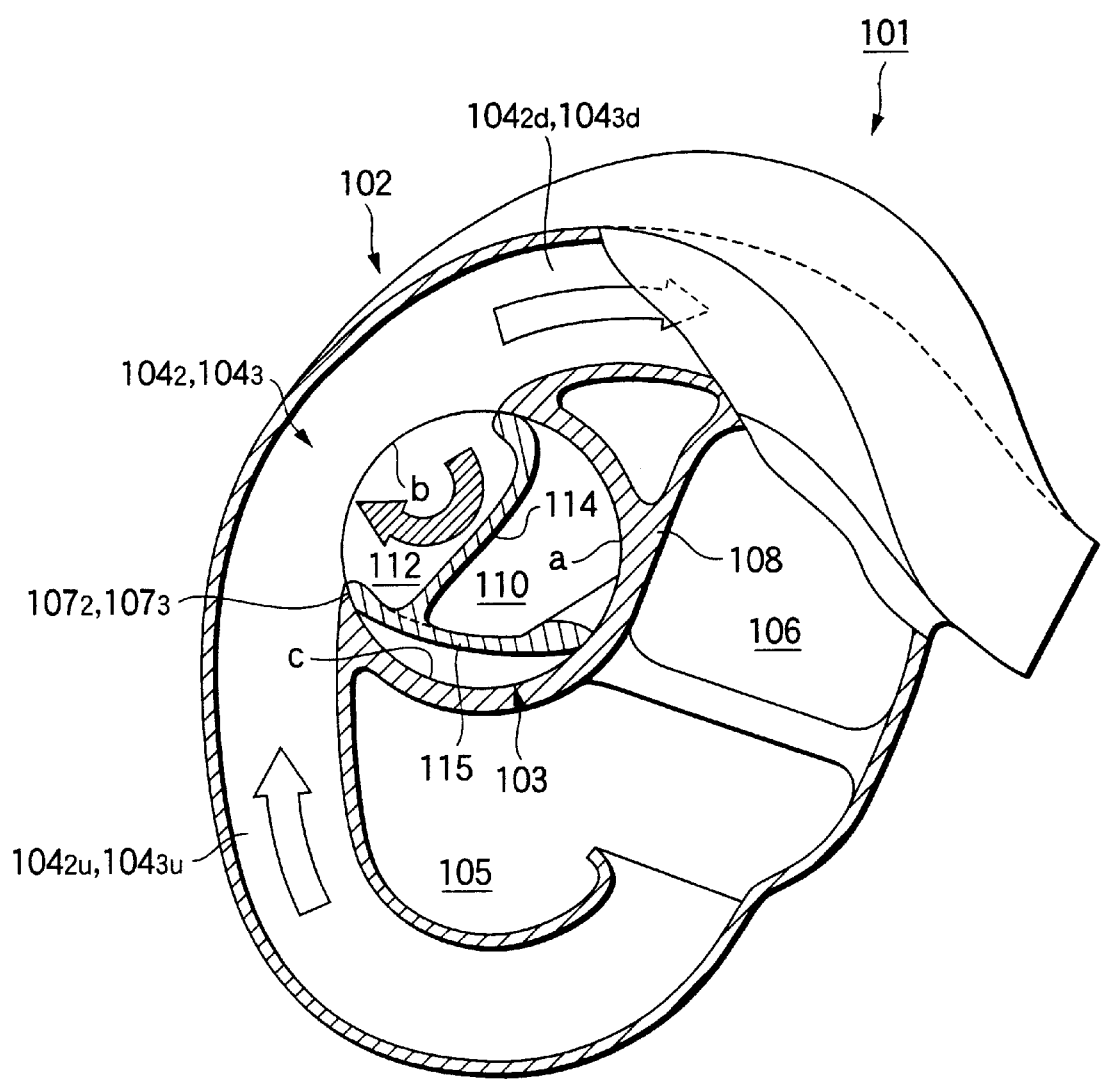
FIG. 12 is a view similar to FIG. 10, which is a cross-sectional view of the variable intake apparatus shown in FIG. 11.

As shown in FIGS. 11 and 12, provided in the imaginary surface b side, which is another of the three imaginary surfaces a, b, c of the rotary valve 103, are communicating chambers $112_1$, $112_2$ which can establish communications, respectively, between the pair of adjacent first and fourth air intake passages $104_1$, $104_4$ connecting to and communicating with the respective cylinders of the pair of cylinders Nos. 1 and 4 which does not have successive intake strokes at one ends thereof and the pair of adjacent second and third air intake passages $104_2$, $104_3$ connecting to connecting to and communicating with the respective cylinders of the pair of cylinders Nos. 2 and 3 which does not have successive intake strokes at one ends thereof. These two communicating chambers $112_1$, $112_2$ are to be referred to collectively as a second communicating chamber 112.

The communicating chamber $112_1$, which is one of the second communicating chamber 112, and the communicating chamber $112_2$, which is the other thereof, are formed by being surrounded by the partition wall (the third partition wall) 114, the partition wall (the first partition wall) 115 and a partition wall (a fourth partition wall) 116 adapted to function as a partition between the centrally located two fourth and second air intake passages. The partition wall (the third partition wall) 114 is formed into a shape which is depressed into the interior of the rotary valve 103 so that the cross-sectional areas of the communicating chambers $112_1$, $112_2$ become substantially equal to the cross-sectional areas of the respective air intake passages $104_1$ to $104_4$.

The first communicating chamber 110 and the second communicating chamber 112 ($112_1$, $112_2$) are closed at the same time by the main body wall portion 108 of the intake manifold 102 when the rotary valve 103 is located at the rotational position shown in FIGS. 9 and 10.

As shown in FIGS. 9 and 10, provided in the imaginary surface c, which is the other of the three imaginary surfaces a, b, c of the rotary valve 103, are partition walls (second partition walls 1 to 3) adapted to block off a communication between the adjacent air intake passages $104_1$ and $104_4$, $104_4$ and $104_2$, and $104_2$ and $104_3$. These partition walls consist of crescent-shaped partition walls (second partition walls 1 to 3) 117 to 119 adapted to function as partitions between the air intake passages and the aforesaid partition wall (the first partition wall) 115. Then, when the rotary valve 103 is located a rotational position as shown in FIG. 10, the partition walls block off a communication between the adjacent air intake passages $104_1$ and $104_4$, $104_4$ and $104_2$, and $104_2$ and $104_3$, respectively, so as to provide four independent passages constituting the long air intake passages $104_1$ to $104_4$ which are perfectly independent from one another.

The partition wall 115 is curved so as to protrude into the respective air intake passages $104_1$ to $104_4$ in such a manner as not to change the sectional configuration of the respective air intake passages $104_1$ to $104_4$ along the longitudinal direction of the passages and is also curved so as to be depressed slightly towards the interior of the rotary valve so that the cross-sectional configurations of the respective air intake passages $104_1$ to $104_4$ along a direction normal to the longitudinal direction thereof are not changed.

The first to fourth partition walls 114 to 119 and the first and second communicating chambers 110, 112 ($112_1$, $112_2$) will be described in greater detail.

The first partition wall 115 extends between two vortexes of an equilateral triangle obtained by dividing at equal intervals the outer circumference of the rotary valve 103 into three and has a length corresponding to the length over which the four air intake passages $104_1$ to $104_4$ which are independent from each other are arranged sideways in line with each other. The three second partition walls 117 to 119 are provided on the first partition wall 115 contiguously therewith so as to be each formed into a crescent shape and cut off a communication between the adjacent air intake passages $104_1$ and $104_4$, $104_4$ and $104_2$, and $104_2$ and $104_3$. The third partition wall 114 extends between the remaining vortex of the equilateral triangle and a point in the vicinity of one of side edges (an upper side edge as viewed in FIG. 10) of the first partition wall 115 and has a length corresponding to the length over which the four air intake passages $104_1$ to $104_4$ which are independent from each other are arranged sideways in line with each other. The fourth partition wall 116 is provided contiguously with the third partition wall 114 and the first partition wall 115 on one of the side edges of the first partition wall 115 and blocks off a communication between the centrally provided two adjacent air intake passages $104_4$, $104_2$. The first communicating chamber 110 and the second communicating chamber 112 ($112_1$, $112_2$) are disposed back to back across the third partition wall 114. Thus, the rotary valve 103 has in total three partitioned communicating chambers 110, $112_1$, $112_2$ in the interior thereof.

The rotary valve 103 comprises the control means as well as the first embodiment for switching over the rotary valve in triple stages in response to the rotational speed of the internal combustion engine such that any of the three imaginary surfaces a, b, c faces the first to fourth openings $107_1$ to $107_4$ in the first to fourth air intake passages $104_1$ to $104_4$.

The control means controls and switches over the rotary valve 103 as will be described below in response to the rotational speed of the internal combustion engine.

First, in the event that the internal combustion engine is in its low engine speed range in which the rotational speed of the engine is lower than a predetermined rotational speed $N_1$, the control means controls and switches over the rotary valve 103 such that the other imaginary surface c of the three imaginary surfaces a, b, c of the rotary valve 103 faces the first to fourth openings $107_1$ to $107_4$ in the first to fourth air intake passages $104_1$ to $104_4$, whereby communications between all the adjacent air intake passages $104_1$ and $104_4$, $104_4$ and $104_2$, and $104_2$ and $104_3$ are blocked off by the partition wall 115 and the partition walls 117 to 119 to thereby form the first to fourth air intake passages which are long and perfectly independent from one another.

Then, intake air inside the intake air collecting chamber 105 flows into and through the first to fourth long air intake passages $104_1$ to $104_4$ for supply into the respective cylinders Nos. 1 to 4. When this occurs, the intake air collecting chamber 105 functions as a portion open to the atmosphere, which becomes a chamber where intake pressure wave pulses are reversed, whereby the intake pressure wave pulse having a low natural frequency inside the long air intake passages $104_1$ to $104_4$ and a long opening and closing cycle of the intake valves based on the low engine speed of the internal combustion engine are tuned to each other to thereby obtain a high inertial supercharging effect, whereby a high intake air charging efficiency can be obtained for each of the cylinders, thus making it possible to improve the output torque of the internal combustion engine (refer to î in FIGS. 8 and 15).

Next, in the event that the internal combustion engine is in its intermediate engine speed range in which the rotational speed of the internal combustion engine is greater than $N_1$ but is lower than a predetermined rotational speed $N_2$ ($N_1 < N_2$), ($N_1 < N < N_2$), as shown in FIGS. 11 and 12, the control means controls and switches over the rotary valve 103 such that another imaginary surface b of the three imaginary surfaces a, b, c of the rotary valve 103 faces the first to fourth openings $107_1$ to $107_4$ in the first to fourth air intake passages $104_1$ to $104_4$, whereby a communication is established between the pair of first and fourth air intake passages $104_1$, $104_4$ connecting to and communicating with the respective cylinders of the pair of cylinders Nos. 1 and 4 which does not have successive intake strokes at one ends thereof and between the pair of second and third air intake passages $104_2$, $104_3$ connecting to and communicating with the respective cylinders of the pair of cylinders Nos. 2 and 3 which does not have successive intake strokes at one ends thereof via the communicating chambers $112_1$, $112_2$, respectively.

Then, respective pairs of air intake passage portions $104_{1u}$, $104_{2u}$ and $104_{2u}$, $104_{3u}$ upstream of the respective communicating portions between the pair of the first and fourth air intake passages $104_1$, $104_4$ and the pair of the second and third air intake passages $104_2$, $104_3$ constitute a resonating system for each pair of cylinders, and the intake pressure waves can be propagated through the respective air intake passages $104_1$ to $104_4$ and the respective communicating portions (the communicating chambers $112_1$, $112_2$ constituting the second communicating chamber 112) without reversing therein for use for the following intake stroke in the other cylinder of the same pair, whereby a high resonating supercharging effect can be obtained, and a high intake air charging efficiency can be obtained for the respective cylinders of the pairs of cylinders Nos. 1, 4 and 2, 3 which do not have successive intake strokes, thereby making it possible to improve the output torque of the internal combustion engine. Thus, it is possible to compensate for drops in intake air charging efficiency and output torque which would result in an intermediate portion between the low engine speed range and the high engine speed range (refer to $\hat{2}$ in FIGS. 8 and 15).

Furthermore, in the event that the internal combustion engine is in its high engine speed range ($N_2 < N$) in which the rotational speed of the engine is higher than $N_2$, as shown in FIGS. 13 and 14, the control means controls and switches over the rotary valve 103 such that one imaginary surface a of the three imaginary surfaces a, b, c of the rotary valve 103 faces the first to fourth openings $107_1$ to $107_4$ in the first to fourth air intake passages $104_1$ to $104_4$, whereby communications are established between all the adjacent air intake passages $104_1$ and $104_4$, $104_4$ and $104_2$, and $104_2$ and $104_3$, which are then put in a state in which all the air intake passages communicate with one another.

Figure 8:
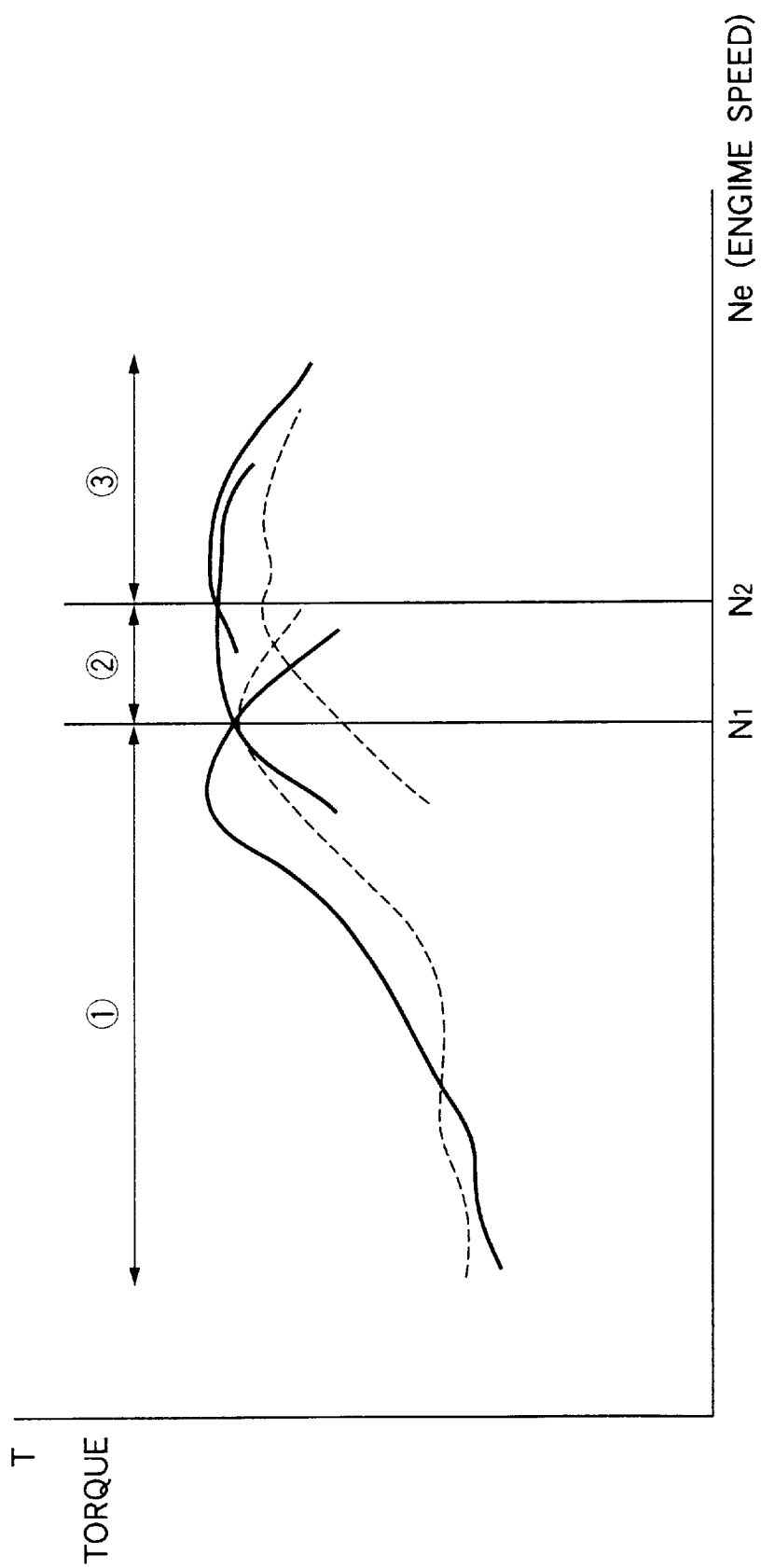
FIG. 8 is a diagram showing characteristics of the variable intake apparatus according to the invention.
Figure 15:
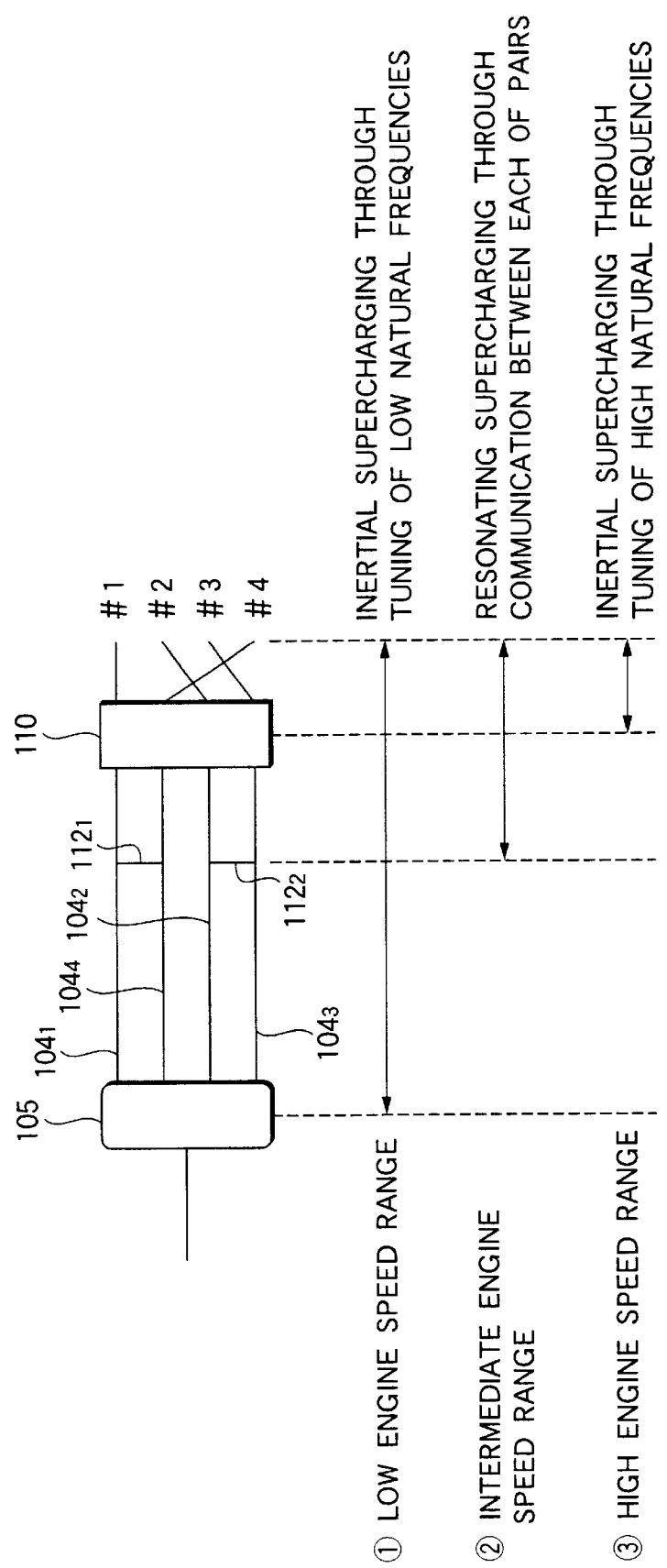
FIG. 15 is a diagram explaining an operation of the second embodiment of the variable intake apparatus shown in FIG. 9.

Since the first communicating chamber 110 which is formed so as to have a large volume drastically change the respective cross-sectional configurations of the first to fourth air intake passages, the chamber functions as a portion open to the atmosphere, and the portion then becomes a chamber where the intake pressure wave pulses are reversed, whereby the intake pressure wave pulse having a high natural frequency inside short air intake passage portions $104_{1d}$ to $104_{4d}$ extending from the combustion chambers to the communicating chamber 10 and a short opening and closing cycle of the intake valves based on the high rotational speed of the engine are tuned to each other to thereby obtain a high inertial supercharging effect, and a high intake air charging efficiency is obtained for all the cylinders, thereby making it possible to improve the output torque of the engine (refer to 3 in FIGS. 8 and 15).

Thus, the flat and high intake air charging efficiency and high output torque can be obtained over a wide range of engine speeds from the low engine speed range to the high engine speed range. In general, when comparing the inertial supercharging effect with the resonating supercharging effect, the inertial one can exhibit a larger effect, and therefore, the resonating supercharging effect is regarded as one for assisting the inertial supercharging effect. According to the embodiment of the invention, however, as has been described heretofore, the drop in intake air charging efficiency at the intermediate portion between the high intake air charging efficiency based on the inertial supercharging effect obtained in the low engine speed range and the high intake air charging efficiency based on the inertial supercharging effect obtained in the high engine speed range is compensated for sufficiently by the improvement in intake air charging efficiency based on the inertial supercharging effect obtained in the intermediate engine speed range. Note that intake air invariably is supplied from the intake air collecting chamber 105 to the respective cylinders Nos. 1 to 4.

Since the second embodiment of the invention is constructed as has been described heretofore, the following advantages can further be provided.

The four air intake passages $104_1$ to $104_4$ which are independent from each other and which connect to and communicate with the respective cylinders of the in-line four-cylinder internal combustion engine, respectively, at one ends thereof and the single intake air collecting chamber at the other ends thereof are arranged sideways in line with each other in the direction in which the cylinders of the internal combustion engine are arranged such that of the air intake passages those connecting to and communicating with the cylinders which do not have successive intake strokes are located adjacent to each other except for the intersecting portion of the air intake passages which is in the vicinity of where the air intake passages connect to and communicate with the respective cylinders of the engine at the one ends thereof. Then, the rotary valve 103 is provided in such a manner that substantially one third of the outer circumference thereof projects into an intermediate portion along the length of the air intake passages $104_1$ to $104_4$ in the arc-like fashion.

As a result, there is no risk that the air intake passages $104_1$ to $104_4$ intersect with one another except for the intersecting portion of the air intake passages which is in the vicinity of where the air intake passages connect to and communicate with the respective cylinders of the engine at the one end, and there is no risk, either, that the rotary valve 103 for performing the variable intake operation protrudes in the length-wise direction of the vehicle or a direction normal to an axis of the valve. Thus, the variable intake apparatus 101 including the intake manifold 102 can be formed compact as viewed from the direction in which the cylinders are arranged, this resulting in a good space efficiency. In addition, this makes it easy to render the respective air intake passages $104_1$ to $104_4$ equal in length.

In addition, since the high intake air charging efficiency and high output torque over the low engine speed range to the high engine speed range can be obtained by constructing the rotary valve 103 provided in such a manner that substantially one third of the outer circumference thereof projects into the intermediate portion along the length of the air intake passages $104_1$ to $104_4$ in the arc-like fashion as the triple-staged rotary valve that can be switched over at equal intervals in response to the rotational speed of the internal combustion engine, the number of components for the valve and actuators is reduced, thereby making it possible to reduce the production cost of the apparatus, simplify the construction of the same and reduce the weight thereof, whereby the variable intake apparatus 101 for an in-line four-cylinder internal combustion engine can easily be obtained which requires less space for installation thereof. Additionally, since the valve body and the shaft portion of the rotary valve 103 do not protrude into the air intake passages $104_1$ to $104_4$, there is caused no risk that the intake resistance is increased.

Additionally, since the rotary valve 103 is switched over for operation by means of electric or negative pressure actuators, the construction of the control means can be made simple for controlling and switching over the rotary valve 103 in triple stages in response to the rotational speed of the internal combustion engine.

In addition, the rotary valve 103 has the three imaginary surfaces a, b, c which are partitioned circumferentially at equal intervals as viewed from the side in the axial direction of the valve, and the three imaginary surfaces of the rotary valve 103 are adapted to be circumferentially switched over in triple stages in response to the rotational speed of the internal combustion engine in such a manner that in the low engine speed range of the internal combustion engine, a communication is cut off through all the adjacent air intake passages $104_1$ and $104_4$, $104_4$ and $104_2$, and $104_2$ and $104_3$, in the intermediate engine speed range of the engine, a communication is established between each of the pairs of adjacent first and fourth air intake passages $104_1$, $104_4$ and second and third air intake passages $104_2$, $104_3$ which both connect at one ends thereof to the respective cylinders of the pairs of cylinders which do not have successive intake strokes, and at the high engine speed range thereof, a communication is established through all the air intake passages $104_1$ and $104_4$, $104_4$ and $104_2$, $104_2$ and $104_3$ which are adjacent to each other.

As a result, since the constructions are imparted on the respective surfaces of the three imaginary surfaces a, b, c which render variable intake operations, respectively, in response to the low, intermediate and high engine speed ranges of the internal combustion engine, the internal construction of the rotary valve 103 can be made relatively simple. In particular, in the intermediate engine speed range of the internal combustion engine, when a communication is established between each of the pairs of first and fourth air intake passages $104_1$, $104_4$ and second and third air intake passages which communicate, respectively, with the respective cylinders of pairs of cylinders which do not have successive intake strokes at one ends thereof, since the air intake passages of each pair are placed adjacent to each other, the partition wall between the air intake passages may only have to be deleted, and therefore, the communicating paths (the second communicating chamber 112 ($112_1$, $112_2$)) therebetween can be constructed very easily.

Additionally, since the first to fourth air intake passages $104_1$ to $104_4$ are curved so as to wind inwardly, the intake air collecting chamber 105 and the intake duct 106 are disposed in the interior space in the curvature of the air intake passages so curved, and the rotary valve 103 is disposed such that part of the outer circumference of the rotary valve 103 is embraced by the wall of the intake air collecting chamber, the variable intake apparatus 101 is arranged in a circular configuration as viewed from the side, whereby the variable intake apparatus can be made compact further, thereby making it possible to improve the space utilization efficiency.

Note that the constructions of the first communicating chamber 110, the second communicating chamber 112 ($112_1$, $112_2$), and the partition walls 114, 115 are not limited to those described in the second embodiment of the invention, but may be modified in various ways.

<Third Embodiment>

With reference to FIGS. 8, 16 to 21 and 25, a description will be given of a variable intake apparatus 201 according to a third embodiment of the invention.

Figure 16:
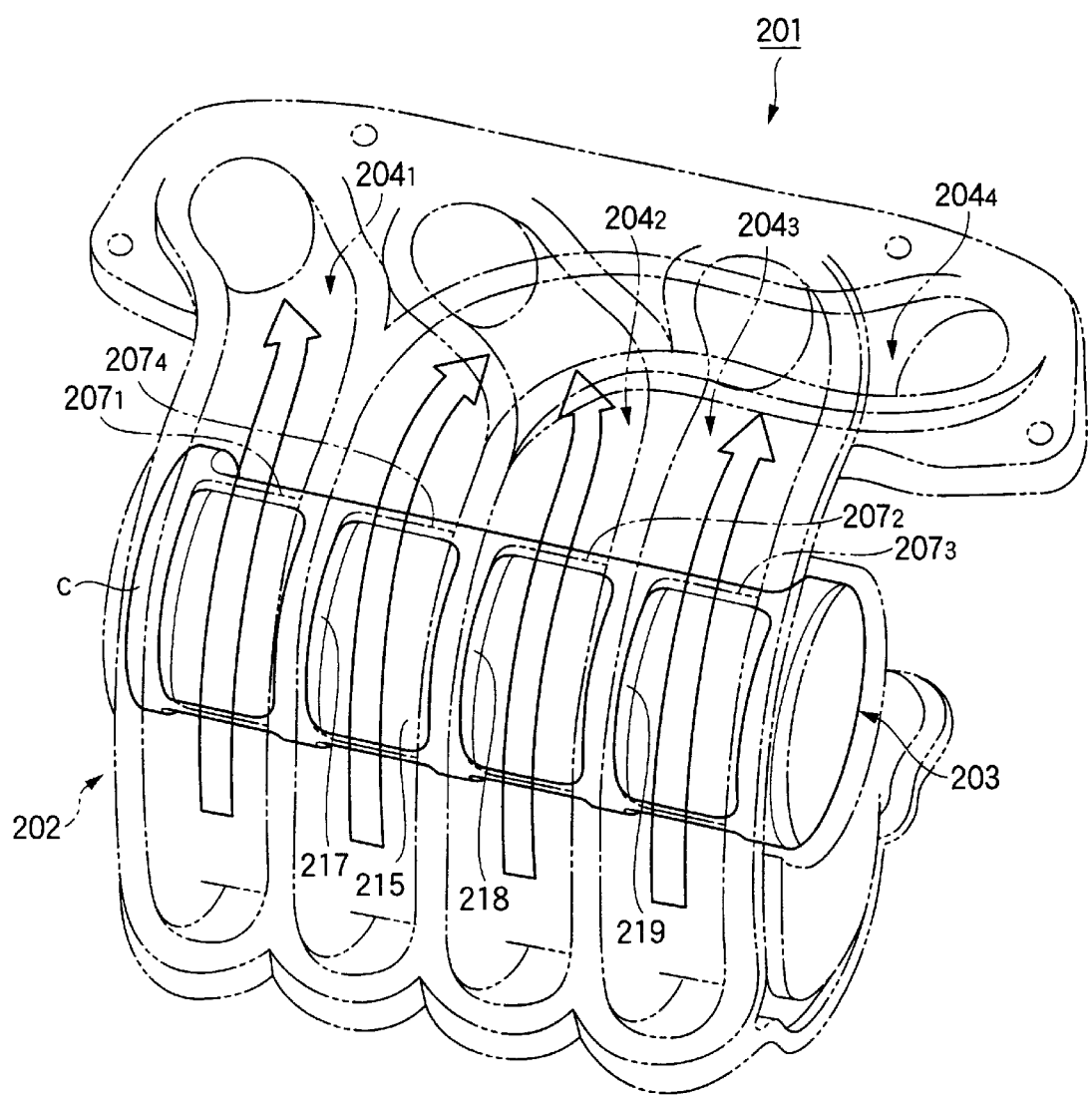
FIG. 16 is a schematic perspective view of a variable intake apparatus for an in-line four-cylinder internal combustion engine according to a third embodiment of the invention, showing an imaginary view of the apparatus as viewed by cutting away an upper half of an air intake passage portion along air intake passages in which the status of a rotary valve when the internal combustion engine is in a low engine speed range thereof is illustrated in conjunction with the status of intake air flowing through the air intake passages in that range.
Figure 17:
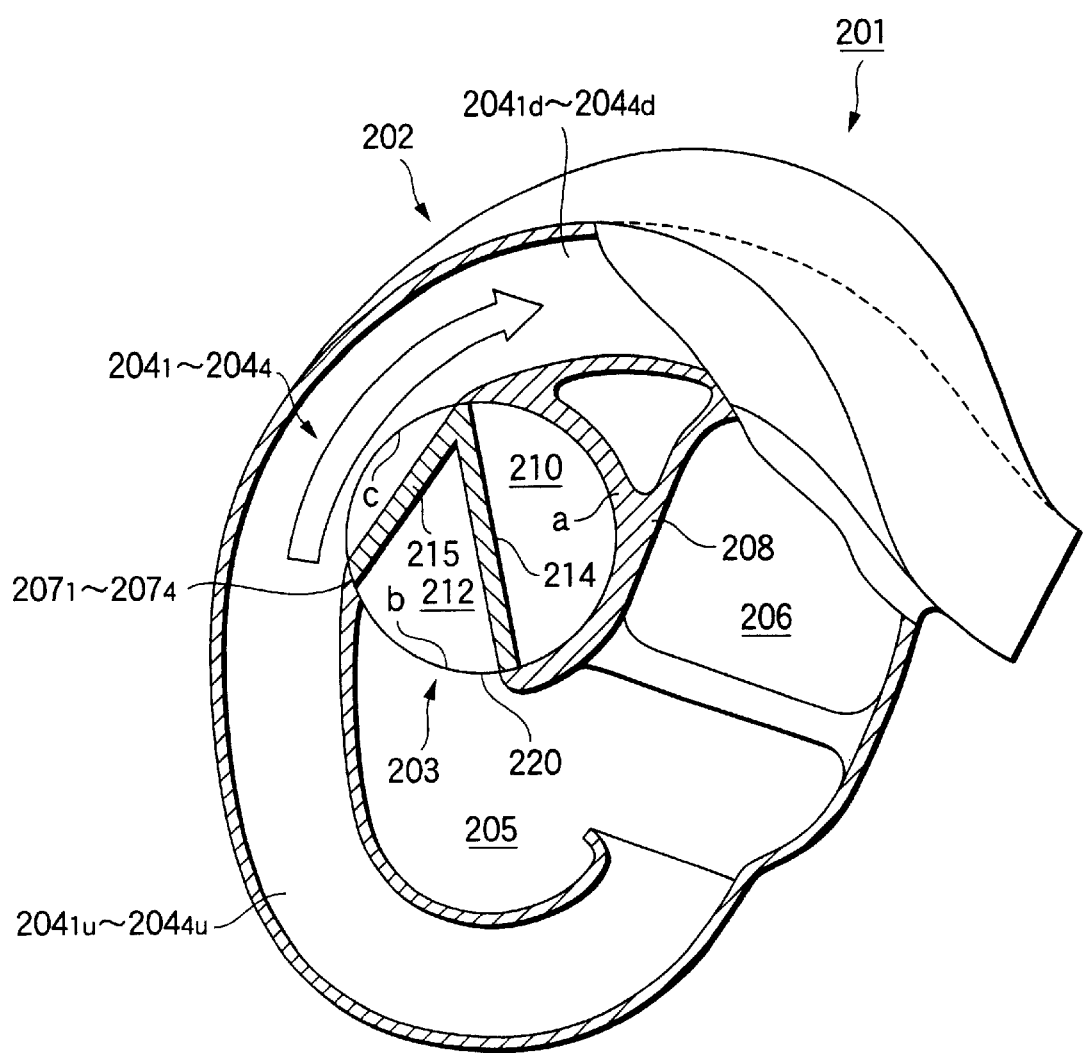
FIG. 17 is a cross-sectional view of the variable intake apparatus of FIG. 16.

In FIGS. 16 and 17, a variable intake apparatus 201 for an in-line four-cylinder internal combustion engine according to the third embodiment of the invention comprises an intake manifold 202 having juxtaposed first to fourth four air intake passages $204_1$ to $204_4$ which are independent from one another and which connect, respectively, to cylinders Nos. 1 to 4 (not shown) of the internal combustion engine at one ends thereof and to a single intake air collecting chamber 205 at the other ends thereof.

The cylinders Nos. 1 to 4 are fired in the order of cylinder No. 1, cylinder No. 3, cylinder No. 4 and cylinder No. 2. Therefore, intake strokes in the respective cylinders take place in that order, and the cylinders Nos. 1 and 4 constitute a pair of cylinders which does not have successive intake strokes, whereas the cylinders Nos. 2 and 3 constitute a pair of cylinders which does not have successive intake strokes.

The air intake passages $204_1$ to $204_4$ are arranged sideways in line with each other in the direction in which the cylinders are arranged such that the air intake passages $204_1$, $204_4$ communicating with the cylinders Nos. 1 and 4 which do not have successive intake periods are located adjacent to each other as a pair, whereas the air intake passages $204_2$, $204_3$ communicating with the cylinders Nos. 2 and 3 which do not have successive intake strokes are located adjacent to each other as a pair except for an intersecting portion of the air intake passages which is in the vicinity of where the air intake passages connect to and communicate with the respective cylinders Nos. 1 to 4 of the engine at one ends thereof (in FIG. 16, a portion where an upper curved portion of the fourth air intake passage $204_4$ intersects with upper curved portions of the second and third air intake passages $204_2$, $204_3$). Therefore, the first and fourth air intake passages $204_1$, $204_4$ are adjacent to each other at a left half portion of the air intake passage portion as viewed in the direction in which the cylinders are arranged, whereas the second and third air intake passages $204_2$, $204_3$ are adjacent to each other at a right-half portion of the air intake passage portion as viewed in the cylinder arrangement direction.

According to the construction, the pairs of adjacent air intake passages connecting to and communicating with the pair of cylinders which does not have successive intake strokes are the pair of the adjacent first and fourth air intake passages $204_1$, $204_4$ connecting to and communicating with the respective cylinders of the pair of cylinders Nos. 1, 4 at one ends thereof and the pair of the adjacent second and third air intake passages $204_2$, $204_3$ connecting to and communicating with the respective cylinders of the pair of cylinders Nos. 2, 3 at one ends thereof.

As shown in FIG. 17, the first to fourth air intake passages $204_1$ to $204_4$ are made substantially equal in length and are curved so as to wind inwardly, and an intake air collecting chamber 205 is provided so as to connect to and communicate with distal ends of the air intake passages so wound. This intake air collecting chamber 205 together with an air intake duct 206 is provided so as to be embraced within an interior space resulting by virtue of the curvature of the curved first to fourth air intake passages $204_1$ to $204_4$ with an intention to make the variable intake apparatus 201.

Intake air led to the air intake duct 206 via an air cleaner and a throttle body which are both not shown then flows into the intake air collecting chamber 205 having a relatively large volume, where it is collected. When the internal combustion engine is in its low to intermediate engine speed range, the intake air then flowing out of the intake air collecting chamber 205 is divided so as to flow through the first to fourth air intake passages $204_1$ to $204_4$ which are relatively long passages into the cylinders Nos. 1 to 4 for intake thereinto. Although a communicating path between the intake duct 206 and the intake air collecting chamber 205 is not shown, the communicating path is provided at a central portion along the length of the intake air collecting chamber 105, whereby the length of the air intake passages including the first to fourth air intake passages $204_1$ to $204_4$ which leads from the intake air collecting chamber 205 to the respective cylinders Nos. 1 to 4 is made to be equal.

First to fourth openings $207_1$ to $207_4$ each having a substantially rectangular shape when viewed from the front are formed, respectively, in bottom walls of the first to fourth air intake passages $204_1$ to $204_4$ at intermediate positions along the lengths thereof, and a single-unit rotary valve 203 is provided such that part thereof protrudes, respectively, into the first to fourth air intake passages through the first to fourth openings $207_1$ to $207_4$. The portion of the rotary valve which protrudes into the first to fourth air intake passages $204_1$ to $204_4$ corresponds to a crescent-like portion, as viewed from an axis of the rotary valve 203, which would result when an arc extending over substantially one third the circumference of the rotary valve is cut away (refer to FIG. 17).

The rotary valve 203 is disposed in such a manner that the semi-cylindrical portion resultant when substantially half the outer circumference of the valve is cut away in an arc-like fashion is embraced by the main body wall portion 208 of the intake manifold 202, while the remaining arc-like portions each having a length of one fourth of the outer circumference of the valve protrude into the intake air collecting chamber 205. This main body wall portion 208 is formed into an arc extending over half the outer circumference of the valve as viewed from the side and is adapted to close first and second communicating chambers 210, 212 ($212_1$, $212_2$), which will be described later, depending on the rotational positions of the rotary valve. Substantially one fourth of the main body wall portion 208 extends towards the intake air collecting chamber 205, and a shortcut opening 220 is formed between a side edge of the portion of the main body wall portion 208 and internal walls of the first to fourth air intake passages $204_1$ to $204_4$ at an intermediate portion along the length thereof for use when the air intake passages and the intake air collecting chamber 205 are caused to communicate with each other in a shortcut fashion.

This rotary valve 203 is located between the intermediate portion of the respective first to fourth air intake passages $204_1$ to $204_4$ and the intake air collecting chamber 205 and is adapted, as will be described later, to establish in a shortcut fashion or block off a communication between the respective air intake passages $204_1$ to $204_4$ and the intake air collecting chamber 205 via the communicating chamber 210, which will be described later, and the first to fourth openings $207_1$ to $207_4$ by being switched over in response to the rotational speed of the internal combustion engine.

Next, the construction, operation and effectiveness of the rotary valve 203 will be described.

As shown in FIG. 17, the rotary valve 203 has three imaginary surfaces a, b, c which are partitioned in the circumferential direction as viewed from the side in an axial direction of the valve, and as will be described in detail below, it is constructed such that a communication is established or blocked off between the adjacent air intake passages $204_1$ and $204_4$, $204_4$ and $204_2$, and $204_2$ and $204_3$ or between the pair of air intake passages $204_1$, $204_4$ which connect to and communicate with the respective cylinders of the pair of cylinders which does not have successive intake strokes and also between the pair of air intake passages $204_2$, $204_3$ which connect to and communicate with the respective cylinders of the pair of cylinders which does not have successive intake strokes, while establishing in a shortcut fashion or blocking off a communication between the respective air intake passages $204_1$ to $204_4$ and the intake air collecting chamber 205 by sequentially switching over the three imaginary surfaces a, b, c in triple stages at equal intervals in the circumferential direction in response to the rotational speed of the internal combustion engine.

The three imaginary surfaces a, b, c of the rotary valve 203 comprise two imaginary surfaces b, c which are each an arc having a length equal to one fourth of the outer circumference of the rotary valve and one imaginary surface a which is an arc having a length equal to a half of the outer circumference of the same valve.

Figure 20:
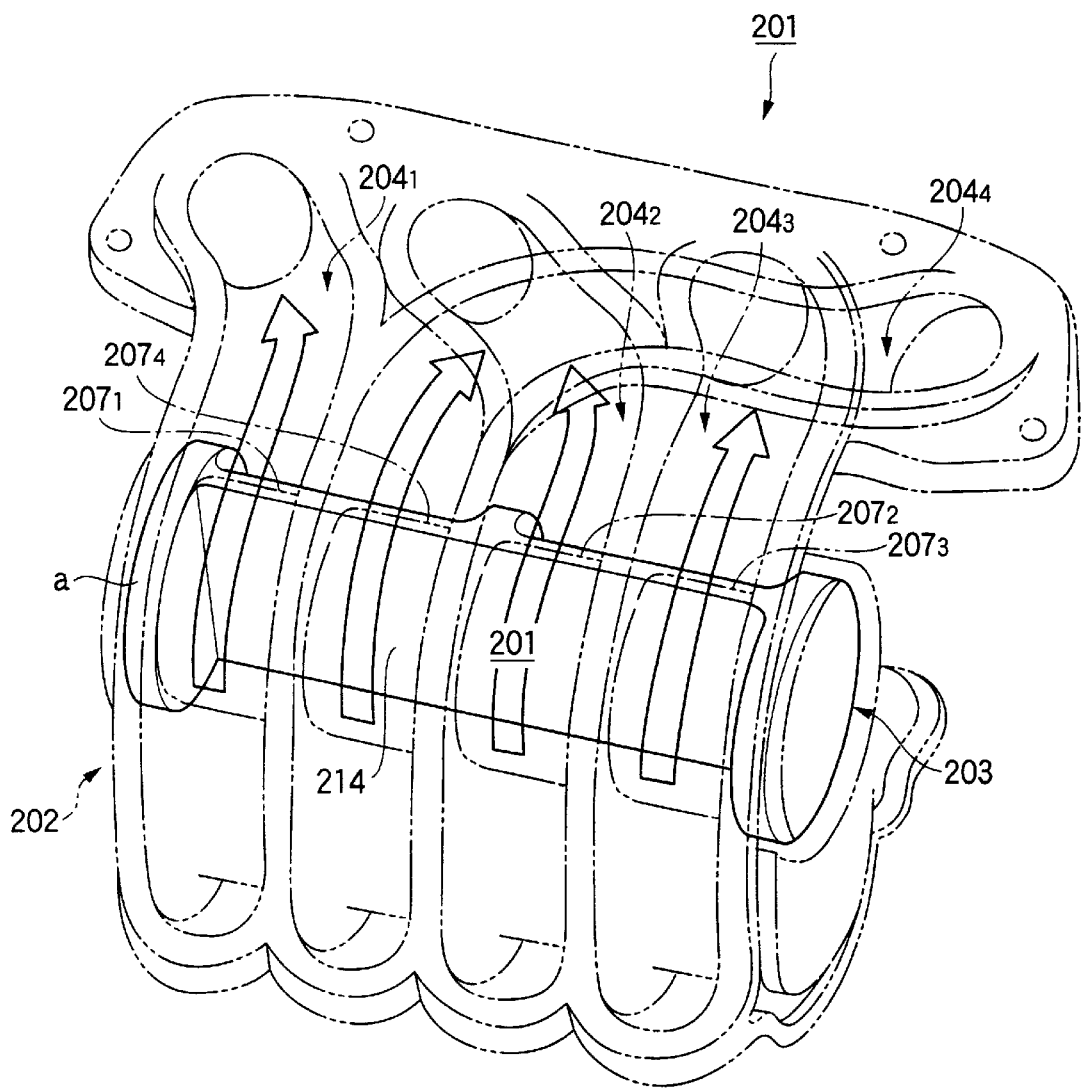
FIG. 20 is a view similar to FIG. 16, which shows the status of the rotary valve when the internal combustion engine is in a high engine speed range thereof in conjunction with the status of intake air flowing through the air intake passages in that range.
Figure 21:
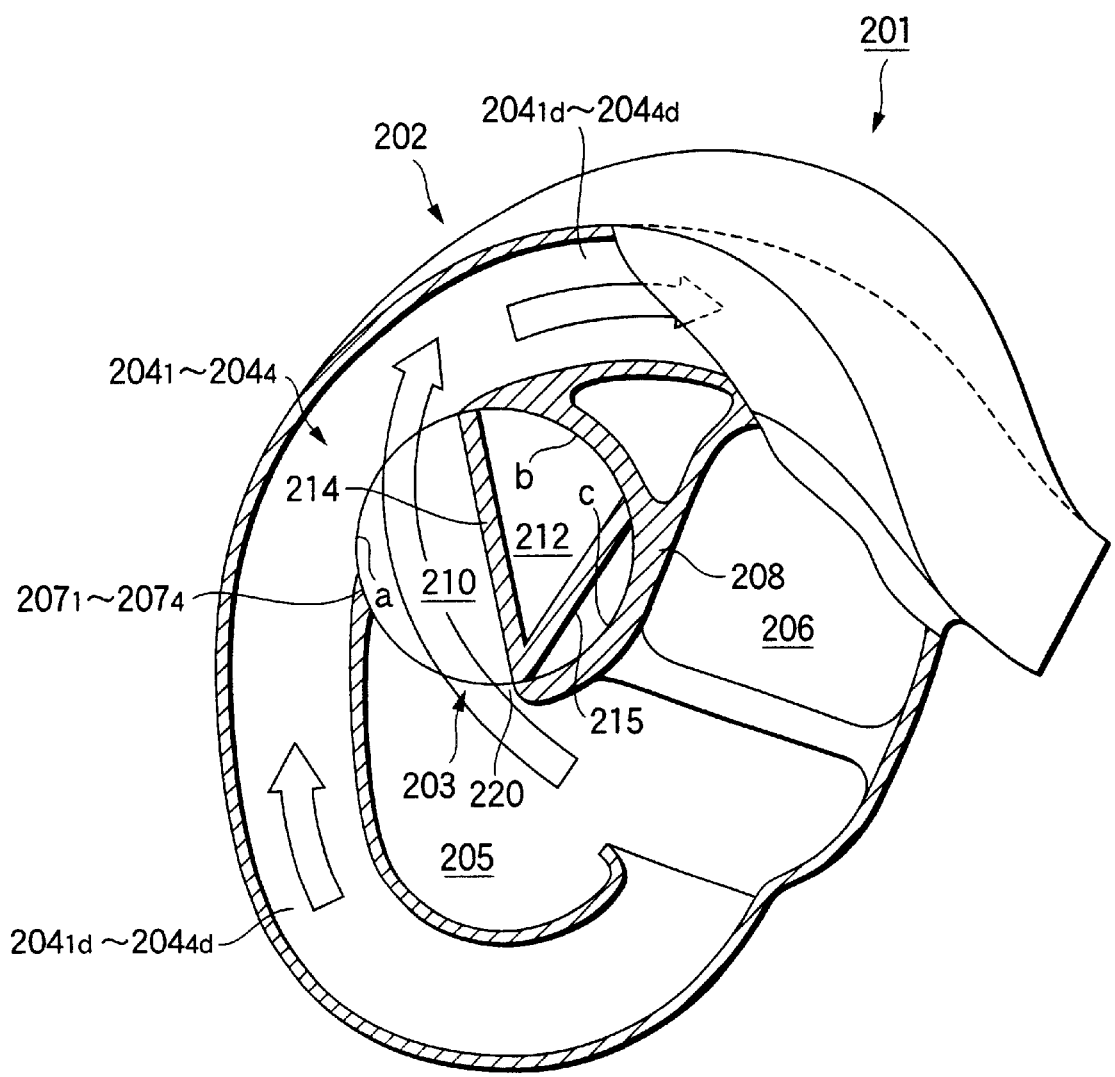
FIG. 21 is a view similar to FIG. 17, which shows a cross-sectional view of the variable intake apparatus shown in FIG. 20.

Provided in the imaginary surface a side, which is one of the three imaginary surfaces a, b, c of the rotary valve 203 is the first communicating chamber 210 having a relatively large volume which can establish a communication between the adjacent air intake passages $204_1$ and $204_4$, $204_4$ and $204_2$, and $204_2$ and $204_3$, and also establish a communication between the respective air intake passages $204_1$ to $204_4$ and the intake air collecting chamber 205, as shown in FIGS. 20 and 21.

Then, when the rotary valve 203 is located at a rotational position as shown in FIGS. 20 and 21, a side portion of the first communicating chamber 210 confronting one of the one fourth arcs (the upper half portion in FIG. 21) faces the first to fourth openings $207_1$ to $207_4$ in the first to fourth air intake passages $204_1$ to $204_4$, and the other side thereof (the lower half portion in FIG. 21) confronting the other one fourth arc faces the intake air collecting chamber 205, and therefore, intake air inside the intake air collecting chamber 205 flows across the interior of the rotary valve 203 through the first communicating chamber 210 out into the first to fourth air intake passages $204_1$ to $204_4$. Thus, the first to fourth air intake passages and the intake air collecting chamber 205 are caused to communicate with each other in a shortcut fashion. The communicating chamber 210 is closed with the main body wall portion 208 of the intake manifold 202 when the rotary valve 203 is located at a position shown in FIGS. 16 and 17.

Figure 18:
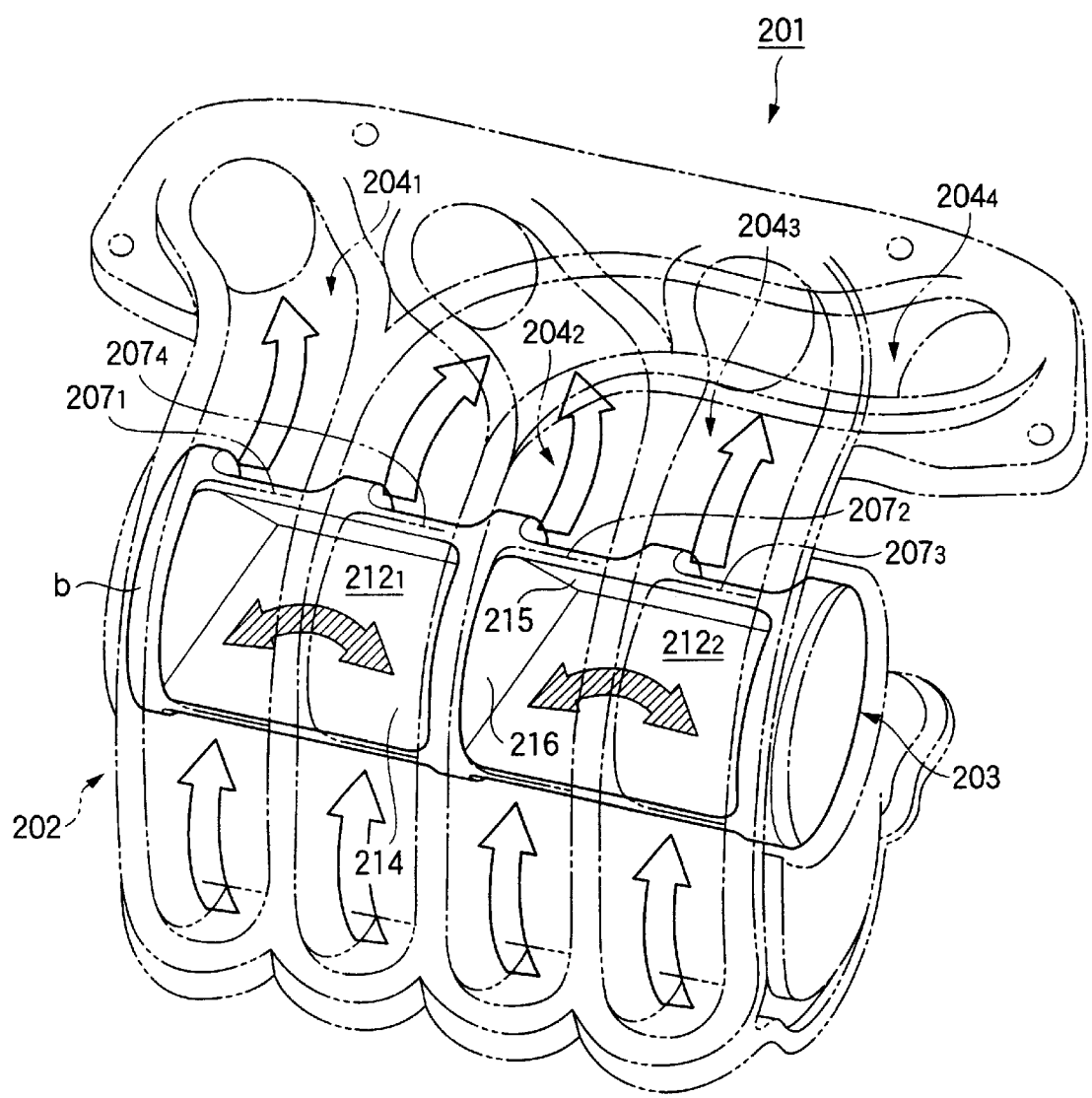
FIG. 18 is a view similar to FIG. 16, showing the status of the rotary valve when the internal combustion engine is in an intermediate engine speed range thereof in conjunction with the status of intake air flowing through the air intake passages in that range.
Figure 19:
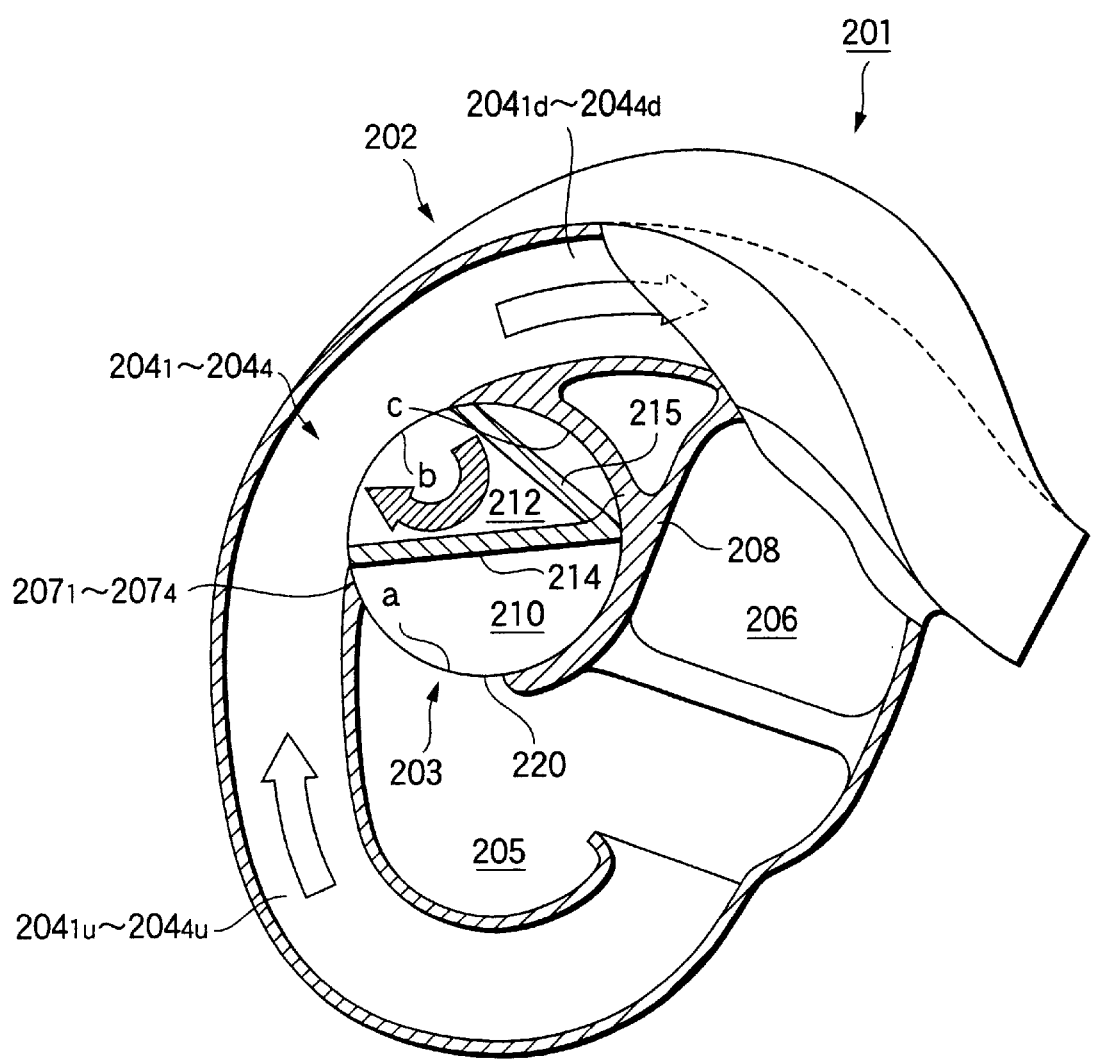
FIG. 19 is a view similar to FIG. 17, which is a cross-sectional view of the variable intake apparatus shown in FIG. 18.

As shown in FIGS. 18 and 19, provided in the imaginary surface b side, which is another of the three imaginary surfaces a, b, c of the rotary valve 203, are communicating chambers $212_1$, $212_2$ which can establish communications, respectively, between the pair of adjacent first and fourth air intake passages $204_1$, $204_4$ connecting to and communicating with the respective cylinders of the pair of cylinders Nos. 1 and 4 which does not have successive intake strokes at one ends thereof and the pair of adjacent second and third air intake passages $204_2$, $204_3$ connecting to connecting to and communicating with the respective cylinders of the pair of cylinders Nos. 2 and 3 which does not have successive intake strokes at one ends thereof. These two communicating chambers $212_1$, $212_2$ are to be referred to collectively as a second communicating chamber 212. The second communicating chamber 212 ($212_1$, $212_2$) is closed with the main body wall portion 208 of the intake manifold 202 when the rotary valve is located at the position shown in FIGS. 20 and 21.

The communicating chamber $212_1$, which is one of the second communicating chamber 212, and the communicating chamber $212_2$, which is the other thereof, are formed by being surrounded by the partition wall (the third partition wall) 214, which constitutes a partition between the surface a and the surface b along the full length of the rotary valve 203, the partition wall (the first partition wall) 215, which constitutes a partition between the surface b and a surface c, which is the other of the three imaginary surfaces a, b, c of the rotary valve 3 and will be described later, along the full length of the rotary valve 203, and a partition wall (a fourth partition wall) 216, which constitutes a partition between the centrally located two fourth and second air intake passages $204_4$, $204_2$. The second communicating chambers 212 ($212_1$, $212_2$) are each desirably formed into a configuration allowing their cross-sectional areas to be substantially equal to those of the respective air intake passages $204_1$ to $204_4$.

As shown in FIGS. 16 and 17, provided in the imaginary surface c, which is the other of the three imaginary surfaces a, b, c of the rotary valve 203, are partition walls (second partition walls 1 to 3) adapted to block off a communication between the adjacent air intake passages $204_1$ and $204_4$, $204_4$ and $204_2$, and $204_2$ and $204_3$. These partition walls consist of crescent-shaped partition walls (second partition walls 1 to 3) 217 to 219 adapted to function as partitions between the air intake passages and the aforesaid partition wall (the first partition wall) 215. Then, when the rotary valve 203 is located a rotational position as shown in FIGS. 16 and 17, there are provided four independent passage portions for forming the completely independent long air intake passages $204_1$ to $204_4$ by blocking off communications between the adjacent air intake passages $204_1$ and $204_4$, $204_4$ and $204_2$, $204_2$ and $204_3$, respectively.

While drawn linearly in FIGS. 16 and 17, the partition wall 215 is curved on the external surface so as to protrude into the respective air intake passages $204_1$ to $204_4$ in such a manner as not to change the sectional configuration of the respective air intake passages $204_1$ to $204_4$ along the longitudinal direction of the passages and is also curved so as to be depressed slightly towards the interior of the rotary valve so that the cross-sectional configurations of the respective air intake passages $204_{1\ to\ 2044}$ along a direction normal to the longitudinal direction thereof are not changed.

The first to fourth partition walls 214 to 219 and the first and second communicating chambers 210, 212 ($212_1$, $212_2$) will be described in greater detail.

The first partition wall 215 extends between two vortexes of a quadrate obtained by dividing circumferentially at equal intervals the outer circumference of the rotary valve 203 into four and has a length corresponding to the length over which the four air intake passages $204_1$ to $204_4$ which are independent from each other are arranged sideways in line with each other. The three second partition walls 217 to 219 are provided on the first partition wall 215 contiguously therewith so as to be each formed into a crescent shape and cut off a communication between the adjacent air intake passages $204_1$ and $204_4$, $204_4$ and $204_2$, and $204_2$ and $204_3$. The third partition wall 214 extends between the two vertexes of the quadrate which face diagonally and has a length corresponding to the length over which the four air intake passages $204_1$ to $204_4$ which are independent from each other are arranged sideways in line with each other. The fourth partition wall 216 is provided so as to extend between the third partition wall 214 and the first partition wall 215 contiguously with and blocks off a communication between the centrally provided two adjacent air intake passages $204_4$, $204_2$. The first communicating chamber 210 and the second communicating chamber 212 ($212_1$, $212_2$) are disposed back to back across the third partition wall 214. Thus, the rotary valve 203 has in total three partitioned communicating chambers 210, $212_1$, $212_2$ in the interior thereof.

The rotary valve 203 comprises the control means as well as the first embodiment for sequentially switching over the rotary valve in triple stages in response to the rotational speed of the internal combustion engine such that any of the three imaginary surfaces a, b, c (the upper half portion thereof with respect to the imaginary surface a) faces the first to fourth openings $207_1$ to $207_4$ in the first to fourth air intake passages $204_1$ to $204_4$. Note that the imaginary surface a is not continuously switched over along the full arc length thereof (arc of one half the full circumferential length of the rotary valve).

The control means controls and switches over the rotary valve 203 as will be described below in response to the rotational speed of the internal combustion engine.

First, in the event that the internal combustion engine is in its low engine speed range in which the rotational speed of the engine is lower than a predetermined rotational speed $N_1$, the control means controls and switches over the rotary valve 203 such that the other imaginary surface c of the three imaginary surfaces a, b, c of the rotary valve 203 faces the first to fourth openings $207_1$ to $207_4$ in the first to fourth air intake passages $204_1$ to $204_4$, whereby communications between all the adjacent air intake passages $204_1$ and $204_4$, $204_4$ and $204_2$, and $204_2$ and $204_3$ are blocked off by the partition wall 215 and the partition walls 217 to 219 to thereby form the first to fourth air intake passages which are long and perfectly independent from one another.

Then, intake air inside the intake air collecting chamber 205 flows into and through the first to fourth long air intake passages $204_1$ to $204_4$ for supply into the respective cylinders Nos. 1 to 4. When this occurs, the intake air collecting chamber 205 functions as a portion open to the atmosphere, which becomes a chamber where intake pressure wave pulses are reversed, whereby the intake pressure wave pulse having a low naturalfrequency inside the long air intake passages $204_1$ to $204_4$ and a long opening and closing cycle of the intake valves based on the low engine speed of the internal combustion engine are tuned to each other to thereby obtain a high inertial supercharging effect, whereby a high intake air charging efficiency can be obtained for each of the cylinders, thus making it possible to improve the output torque of the internal combustion engine (refer to $\hat{1}$ in FIGS. 8 and 25). Note that when this happens, the volumes of the second communicating chambers 212 ($212_1$, $212_2$) add to that of the intake air collecting chamber 205, and this increases the reverse chamber for intake air pressure pulses to that extend, thereby enhancing the aforesaid effect.

Next, in the event that the internal combustion engine is in its intermediate engine speed range in which the rotational speed of the internal combustion engine is greater than $N_1$ but is lower than a predetermined rotational speed $N_2$ ($N_1<N_2$), ($N_1<N<N_2$), as shown in FIGS. 18 and 19, the control means controls and switches over the rotary valve 203 such that another imaginary surface b of the three imaginary surfaces a, b, c of the rotary valve 203 faces the first to fourth openings $207_1$ to $207_4$ in the first to fourth air intake passages $204_1$ to $204_4$, whereby a communication is established between the pair of first and fourth air intake passages $204_1$, $204_4$ connecting to and communicating with the respective cylinders of the pair of cylinders Nos. 1 and 4 which does not have successive intake strokes at one ends thereof and between the pair of second and third air intake passages $204_2$, $204_3$ connecting to and communicating with the respective cylinders of the pair of cylinders Nos. 2 and 3 which does not have successive intake strokes at one ends thereof via the communicating chambers $212_1$ and $212_2$, respectively.

Then, the respective pairs of air intake passage portions $204_{1u}$, $204_{2u}$ and $204_{2u}$, $204_{3u}$ upstream of the respective communicating portions (the communicating chambers $212_1$ and $212_2$ constructing the second communicating chamber) between the pair of the first and fourth air intake passages $204_1$, $204_4$ and the pair of the second and third air intake passages $204_2$, $204_3$ constitute a resonating system for each pair of cylinders, and the intake pressure waves can be propagated through the respective air intake passages $204_1$ to $204_4$ and the respective communicating portions (the communicating chambers $212_1$ and $212_2$) without reversing therein for use for the following intake stroke in the other cylinder of the same pair, whereby a high resonating supercharging effect can be obtained, and a high intake air charging efficiency can be obtained for the respective cylinders of the pairs of cylinders Nos. 1, 4 and 2, 3 which do not have successive intake strokes, thereby making it possible to improve the output torque of the internal combustion engine. Thus, it is possible to compensate for drops in intake air charging efficiency and output torque which would result in an intermediate portion between the low engine speed range and the high engine speed range (refer to 2 in FIGS. 8 and 25).

Furthermore, next, in the event that the internal combustion engine is in its high engine speed range ($N_2 < N$) in which the rotational speed of the engine is higher than $N_2$, as shown in FIGS. 20 and 21, the control means controls and switches over the rotary valve 203 such that the one imaginary surface a of the three imaginary surfaces a, b, c of the rotary valve 203 faces the first to fourth openings $207_1$ to $207_4$ in the first to fourth air intake passages $204_1$ to $204_4$ and the intake air collecting chamber 205 whereby communications are established between all the adjacent air intake passages $204_1$ and $204_4$, $204_4$ and $204_2$, and $204_2$ and $204_3$, while establishing a communication in a shortcut fashion between the respective air intake passages $204_1$ to $204_4$ and the intake air collecting chamber 205 via the first communicating chamber 210.

Figure 25:
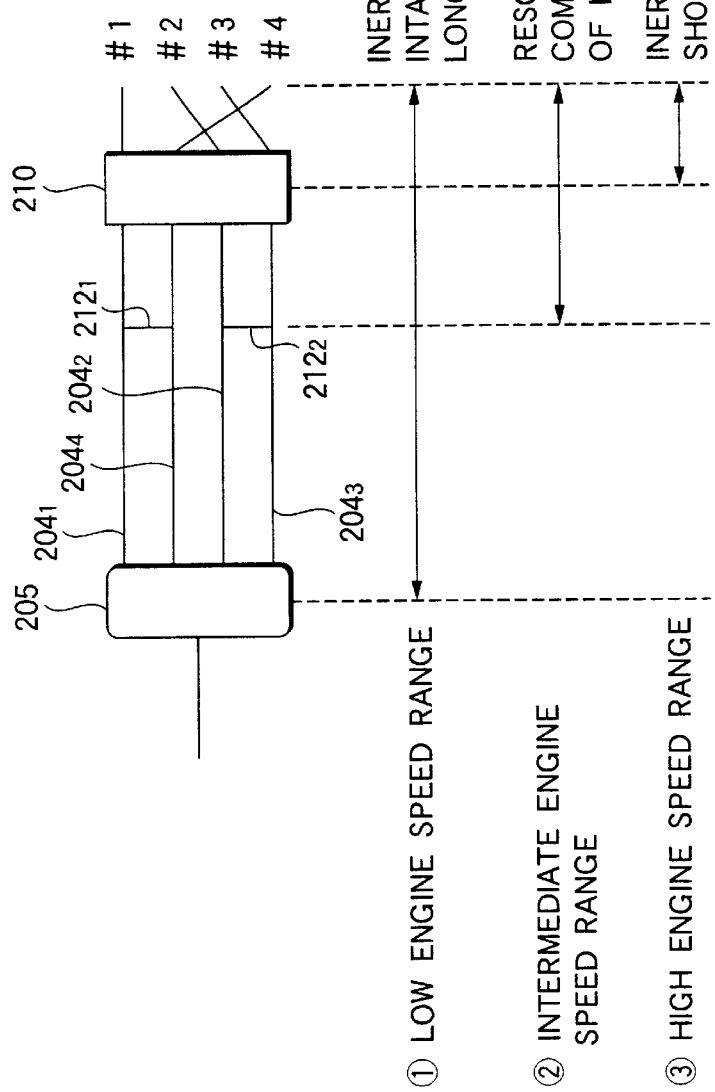
FIG. 25 is a diagram explaining an operation of the variable intake apparatus for an in-line four-cylinder internal combustion engine of the third embodiment.

When this occurs, the first communicating chamber 210 which is formed so as to have a relatively large volume and the intake air collecting chamber 205 function as a portion open to the atmosphere and constitute a reverse chamber for intake pressure wave pulses, whereby the intake pressure wave pulse having a high natural frequency inside short air intake passage portions $204_{1d}$ to $204_{4d}$ extending from the combustion chambers to the communicating chamber 210 and a short opening and closing cycle of the intake valves based on the high rotational speed of the engine are tuned to each other to thereby obtain a high inertial supercharging effect, and a high intake air charging efficiency is obtained for all the cylinders, thereby making it possible to improve the output torque of the engine (refer to 3 in FIGS. 8 and 25).

Thus, the flat and high intake air charging efficiency and high output torque can be obtained over a wide range of engine speeds from the low engine speed range to the high engine speed range. In general, when comparing the inertial supercharging effect with the resonating supercharging effect, the inertial one can exhibit a larger effect, and therefore, the resonating supercharging effect is regarded as one for assisting the inertial supercharging effect. According to the third embodiment of the invention, however, as has been described heretofore, the drop in intake air charging efficiency at the intermediate portion between the high intake air charging efficiency based on the inertial supercharging effect obtained in the low engine speed range and the high intake air charging efficiency based on the inertial supercharging effect obtained in the high engine speed range is compensated for sufficiently by the improvement in intake air charging efficiency based on the inertial supercharging effect obtained in the intermediate engine speed range.

Since the third embodiment of the invention is constructed as has been described heretofore, the following advantages can further be provided.

The four air intake passages $204_1$ to $204_4$ which are independent from each other and which connect to and communicate with the respective cylinders of the in-line four-cylinder internal combustion engine, respectively, at one ends thereof and the single intake air collecting chamber at the other ends thereof are arranged sideways in line with each other in the direction in which the cylinders of the internal combustion engine are arranged such that of the air intake passages those connecting to and communicating with the cylinders which do not have successive intake strokes are located adjacent to each other except for the intersecting portion of the air intake passages which is in the vicinity of where the air intake passages connect to and communicate with the respective cylinders of the engine at the one ends thereof. Then, the rotary valve 203 is provided in such a manner that substantially one fourth of the outer circumference thereof projects into an intermediate portion along the length of the air intake passages $204_1$ to $204_4$ in the arc-like fashion.

As a result, there is no risk that the air intake passages $204_1$ to $204_4$ intersect with one another except for the intersecting portion of the air intake passages which is in the vicinity of where the air intake passages connect to and communicate with the respective cylinders of the engine at the one end, and there is no risk, either, that the rotary valve 203 for performing the variable intake operation protrudes in the length-wise direction of the vehicle or a direction normal to an axis of the valve. Thus, the variable intake apparatus 201 including the intake manifold 202 can be formed compact as viewed from the direction in which the cylinders are arranged, this resulting in a good space efficiency. In addition, this makes it easy to render the respective air intake passages $204_1$ to $204_4$ equal in length.

In addition, since the high intake air charging efficiency and high output torque over the low engine speed range to the high engine speed range can be obtained by constructing the rotary valve 203 provided in such a manner that substantially one fourth of the outer circumference thereof projects into the intermediate portion along the length of the air intake passages $204_1$ to $204_4$ in the arc-like fashion as the triple-staged rotary valve that can be switched over at equal intervals in response to the rotational speed of the internal combustion engine, the number of components for the valve and actuators is reduced, thereby making it possible to reduce the production cost of the apparatus, simplify the construction of the same and reduce the weight thereof, whereby the variable intake apparatus 201 for an in-line four-cylinder internal combustion engine can easily be obtained which requires less space for installation thereof. Additionally, since the valve body and the shaft portion of the rotary valve 203 do not protrude into the air intake passages $204_1$ to $204_4$, there is caused no risk that the intake resistance is increased.

Additionally, since the rotary valve 203 is switched over for operation by means of electric or negative pressure actuators, the construction of the control means can be made simple for controlling and switching over the rotary valve 203 in triple stages in response to the rotational speed of the internal combustion engine.

In addition, the rotary valve 203 has the three imaginary surfaces a, b, c which are partitioned circumferentially as viewed from the side in the axial direction of the valve, and the three imaginary surfaces of the rotary valve 203 are adapted to be circumferentially switched over in triple stages at equal intervals in response to the rotational speed of the internal combustion engine in such a manner that in the low engine speed range of the internal combustion engine, a communication is cut off through all the adjacent air intake passages $204_1$ and $204_4$, $204_4$ and $204_2$, and $204_2$ and $204_3$, in the intermediate engine speed range of the engine, a communication is established between each of the pairs of adjacent first and fourth air intake passages $204_1$, $204_4$ and second and third air intake passages $204_2$, $204_3$ which both connect at one ends thereof to the respective cylinders of the pairs of cylinders which do not have successive intake strokes, and at the high engine speed range thereof, not only a communication is established through all the air intake passages $204_1$ and $204_4$, $204_4$ and $204_2$, $204_2$ and $204_3$ which are adjacent to each other, but also a communication between the respective air intake passages $204_1$ to $204_4$ are established in a shortcut fashion via the first communicating chamber 210.

As a result, since the constructions are imparted on the respective surfaces of the three imaginary surfaces a, b, c which render variable intake operations, respectively, in response to the low, intermediate and high engine speed ranges of the internal combustion engine, the internal construction of the rotary valve 203 can be made relatively simple. In particular, in the intermediate engine speed range of the internal combustion engine, when a communication is established between each of the pairs of first and fourth air intake passages $204_1$, $204_4$ and second and third air intake passages which communicate, respectively, with the respective cylinders of pairs of cylinders which do not have successive intake strokes at one ends thereof, since the air intake passages of each pair are placed adjacent to each other, the partition wall between the air intake passages may only have to be deleted, and therefore, the communicating paths (the second communicating chamber 212 ($212_1$, $212_2$)) therebetween can be constructed very easily.

In addition, since the respective air intake passages $204_1$ to $204_4$ and the intake air collecting chamber 205 are caused to communicate with each other in a shortcut fashion via the rotary valve 203, even if the respective air intake passage portions (long air intake passage portions) $204_{1u}$ to $204_{4u}$ upstream of the communicating chambers 212 ($212_1$, $212_2$) between the adjacent air intake passages $204_1$ and $204_4$, $204_4$ and $204_2$, $204_2$ and $204_3$ are made thinner, and the low engine speed range is shifted down towards a lower engine speed side, an intake air flow rate required at the high engine speed range can be secured sufficiently, and the intake apparatus can be formed more compact.

Furthermore, the first to fourth air intake passages $204_{1u}$ to $204_{4u}$ are curved so as to wind inwardly, and the intake air collecting chamber 205 and the air intake duct 206 are disposed in an internal space in the curvature of the curved air intake passages. Moreover, the rotary valve 203 is disposed such that part of the outer circumference thereof (substantially half the full circumference thereof) is embraced by the main body wall portion 208 of the intake manifold 202 including the wall of the intake air collecting chamber 205. Thus, in this construction, the variable intake apparatus 201 can be formed into a circular or round shape as viewed from the side, whereby the variable intake apparatus 201 can be made more compact, providing a better space efficiency.

<Fourth Embodiment>

Next, a description will be given of a fourth embodiment of the invention with reference to in FIGS. 22 to 24.

Figure 22:
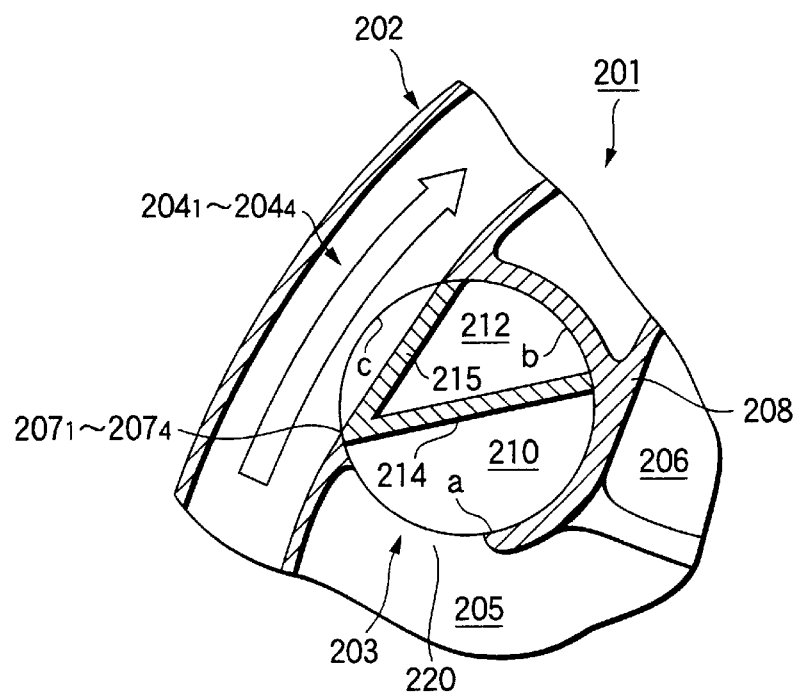
FIG. 22 is a cross-sectional view of a peripheral portion of a rotary valve of a variable intake apparatus for an in-line four-cylinder internal combustion engine according to a fourth embodiment of the invention, corresponding to FIG. 17.
Figure 23:
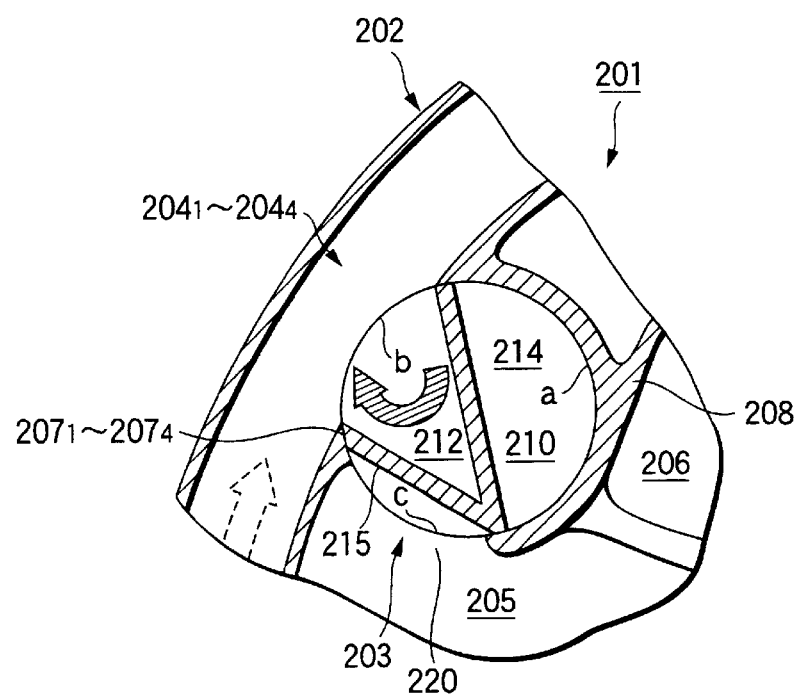
FIG. 23 is a cross-sectional view showing the peripheral portion of a rotary valve of the fourth embodiment corresponding to FIG. 19.
Figure 24:
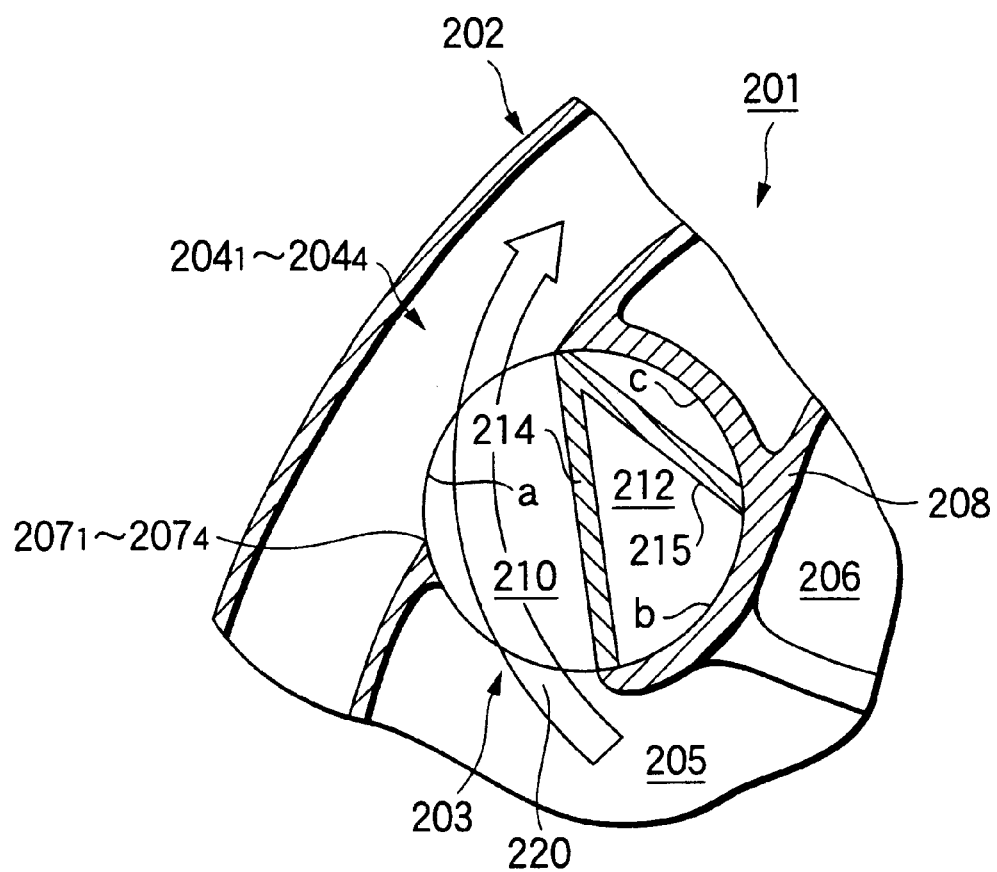
FIG. 24 is a cross-sectional view showing the peripheral portion of the rotary valve of the fourth embodiment corresponding to FIG. 21.

FIGS. 22 to 24 are diagrams corresponding to FIGS. 17, 19 and 21 which show the respective peripheral portions of the rotary valve, and like reference numerals are imparted to like portions.

In FIGS. 22 to 24, when compared with the third embodiment, a variable intake apparatus 201 according to the fourth embodiment differs in that a rotary valve 203 has a first partition wall 215 on an opposite side of a third partition wall 214, and that first to fourth air intake passages $204_1$ to $204_4$ are formed slightly more linearly at portions before and after they pass through a protruding portion of the rotary valve 203.

As described above, when compared with the rotary valve 203 of the third embodiment, since the rotary valve 203 according to the fourth embodiment has the first partition wall 215 on the opposite side of the third partition wall, the direction in which three imaginary surfaces a, b, c of the rotary valve 203 are sequentially switched over in triple stages in the circumferential direction is changed to a counterclockwise direction, whereas in the third embodiment, they are switched over in the clockwise direction.

Furthermore, when the three imaginary surfaces a, b, c of the rotary valve 203 is switched over circumferentially in triple stages in response to the rotational speed of the internal combustion engine, in the fourth embodiment, they are switched over sequentially in triple stages at irregular intervals (at 0 degree, 90 degrees, 270 degrees), whereas in the third embodiment, the surfaces are switched over sequentially in triple stages at regular intervals (at 0 degree, 90 degrees, 180 degrees).

While the fourth embodiment differs from the third embodiment in those aspects, they are identical to each other in the other aspects, and hence the description thereof will be omitted.

Being constructed as described above, the fourth embodiment provides the following advantages.

In particular, at the intermediate engine speed range of the internal combustion engine, the imaginary surface b which is the arc having the length of one fourth of the outer circumference of the rotary valve 203 as viewed from the side protrudes (refer to FIG. 23) into the intermediate portion of the air intake passages $204_1$ to $204_4$, and when this occurs, the third partition wall 214 constituting the longest arc-like portion of the rotary valve 203 is located more rearward than the first partition wall 215 which is the arc cutting away one fourth of the outer circumference of the rotary valve 203 in the flow of intake air and takes an inclined posture relative to the flow of intake air.

As a result, when the intake air flow passes through the protruding portion of the rotary valve 203, the degree that the intake air flow is disturbed by a side edge on the air intake passage side of the third partition wall 214, or the intake air flow is met with the resistance of the flow, becomes lower than the third embodiment that the first partition wall 215 is located more rearward than the third partition wall 214 in the flow of intake air (refer to FIG. 19), whereby the air intake resistance is reduced further, and intake air is supplied smoothly into the cylinders Nos. 1 to 4.

An advantage like this is exhibited more clearly, as with the fourth embodiment of the present invention, where the first to fourth air intake passages $204_1$ to $204_4$ are formed slightly more linear at the portions before and after the air intake passages pass through the protruding portion of the rotary valve 203. This is because in a case like that, intake air flows through the respective cross-sections of the first to fourth air intake passages $204_1$ to $204_4$ substantially at equal speed and when compared with the case where the first to fourth air intake passages $204_1$ to $204_4$ are curved, a relatively large volume of intake air flows down while contacting the air intake passage side edge portion of the third partition wall 214.

In addition, at the low engine speed range of the internal combustion engine, the imaginary surface c which is the arc extending one fourth the outer circumference of the rotary valve 203 as viewed from the side protrudes into the intermediate portion of the air intake passages (refer to FIG. 22), and when this occurs, the first communicating chamber 210 opens toward the intake air collecting chamber 205. This communicating chamber 210 is separated from the second communicating chambers 212 by the third partition wall 214 and has the larger capacity than those of the second communicating chambers 212. Thus, this increases more the volume of the intake air collecting chamber 205 than when the second communicating chambers 212 become open towards the intake air collecting chamber 205 (refer to FIG. 17).

As a result, the function of the intake air collecting chamber as the portion open to the atmosphere (the reverse chamber for intake pressure wave pulses) is increased, whereby the inertial supercharging effect in the low engine speed of the internal combustion engine is improved and a higher intake air charging efficiency can be obtained, thereby making it possible to improve the output torque of the engine.

Note that the constructions of the first communicating chamber 210, the second communicating chamber 212 ($212_1$, $212_2$), and the partition walls 214, 215 are not limited to those described in the first and second embodiments of the invention, but may be modified in various ways.

<Fifth Embodiment>

Next, a description will be given in detail of a fifth embodiment in which a seal construction is fitted to the rotary valve of the variable intake apparatus of the first embodiment with reference to FIGS. 26 and 27.

As is shown in FIG. 2, the rotary valve 3 is embraced rotatably by rear wall surfaces of the portions of the first to fourth air intake passages $4_1$ to $4_4$ which are parent bodies in which the first to fourth openings $7_1$ to $7_4$ are formed and the arc-like surfaces of the main body wall portion 8, and seal members are mounted on outer circumferential surface portions of the rotary valve 3 where the rotary valve 3 is brought into friction contact with the embracing surfaces when rotating.

The following eight members are provided as the outer circumferential surface portions of the rotary valve 3. Namely, as shown in FIGS. 26 and 27, they are first to fifth sliding faces $21_1$ to $21_5$ that are formed at regular intervals from one end to the other end of the rotary valve 3 in the axially longitudinal direction thereof and which extends circumferentially and first to third sliding faces $22_1$ to $22_3$ that are formed at regular intervals in the circumferential direction of the rotary valve 3 and which extends axially longitudinally.

The first and fifth circumferentially extending sliding faces $21_1$, $21_5$ constitute outer circumferential surfaces at the ends of the rotary valve 3, respectively, and they are perfect circumferential surfaces extending around the all outer circumference of the rotary valve 3. The second circumferentially extending face $21_2$ constitutes an outer circumferential surface of a partition wall body which consists of a crescent-shaped partition wall 18 (refer to FIG. 1) and a partition wall 16 (refer to FIG. 3) which are made contiguous with each other, the crescent-shaped partition wall 18 constituting a first one of second partition walls and the partition wall 16 constituting a first one of fourth partition walls, to thereby form an arc-like surface extending substantially two thirds the outer circumference of the rotary valve 3. Additionally, the third circumferentially extending sliding face $21_3$ located at a axially longitudinally central position constitutes a crescent-shaped partition wall 19 (refer to FIG. 1) constituting a second one of the second partition walls to thereby form an arc-like surface extending substantially one third the outer circumference of the rotary valve 3. Furthermore, the fourth circumferentially extending sliding surface $21_4$ constitutes an outer circumferential surface of a partition wall body which consists of a crescent-shaped partition wall 20 (refer to FIG. 1) and a partition wall 17 (refer to FIG. 3) which are made contiguous with each other, the crescent-shaped partition wall 20 constituting a third one of the second partition walls and the partition wall 17 constituting a second one of the fourth partition walls, to thereby form an arc-like surface extending substantially two thirds the outer circumference of the rotary valve 3.

The third circumferentially extending sliding face $21_3$ is partially cut away so as to form a first communicating chamber 10 and a communicating chamber (refer to FIG. 3) which constitutes a first one of communicating chambers 12 and therefore, the third sliding face $21_3$ remains as an arc-like surface extending only substantially one third the outer circumference of the rotary valve 3.

The first and third axially longitudinally extending sliding faces $22_1$, $22_3$ are formed along side edges of a partition wall 15. Additionally, the second axially longitudinally extending sliding face $22_2$ formed along a side edge which is opposite to a side which joins to the first partition wall 15 of third partition walls 14. These three sliding faces $22_1$ to $22_3$ are spaced away at 120 degree intervals from each other.

Seal ring mounting grooves are formed in the first to fifth circumferentially extending sliding faces $21_1$ to $21_5$ and the first to third axially longitudinally extending sliding faces $22_1$ to $22_3$ along the longitudinal direction of the respective sliding faces, and seal members of lengths corresponding to the lengths of the respective sliding faces are mounted in the sliding grooves.

Of first to third seal plates $24_1$ to $24_3$, the first and third seal plates $24_1$, $24_3$ have each five recessed portions 26 which are each adapted to fit in first to five seal rings $23_1$ to $23_5$ and are of the same shape. The second seal plate $24_2$ has four recessed portions 26 adapted to fit in the first, second, fourth and fifth seal rings $23_1$, $23_2$, $23_4$, $23_5$, respectively.

The first, second, fourth and fifth seal rings $23_1$, $23_2$, $23_4$, $23_5$, each have three recessed portions 25 for fitting with the first to third seal plates $24_1$ to $24_3$. Additionally, the third seal ring $23_3$ has two recessed portions 25 for fitting with the first and third seal plates $24_1$, $24_3$, respectively.

Consequently, the first to fifth seal rings $23_1$ to $23_5$ and the first to third seal plates $24_1$ to $24_3$ fit in each other at least two locations for assembly and integration, whereby when these are mounted on the respective sliding faces of the rotary valve 3, the first to fifth seal rings $23_1$ to $23_5$ are held by the first to third seal plates $24_1$ to $24_3$ at at least two locations so that the seal rings do not move in particular in the circumferential direction of the rotary valve 3. Thus, sealing is designed to be effected between all the adjacent stages, as well as all the adjacent air intake passages $4_1$ and $4_2$, $4_2$ and $4_3$, $4_3$ and $4_4$ of the rotary valve 3 adapted to be switched over in triple stages circumferentially in response to the engine speed of the internal combustion engine by virtue of the combination of the seal members.

Figure 26:
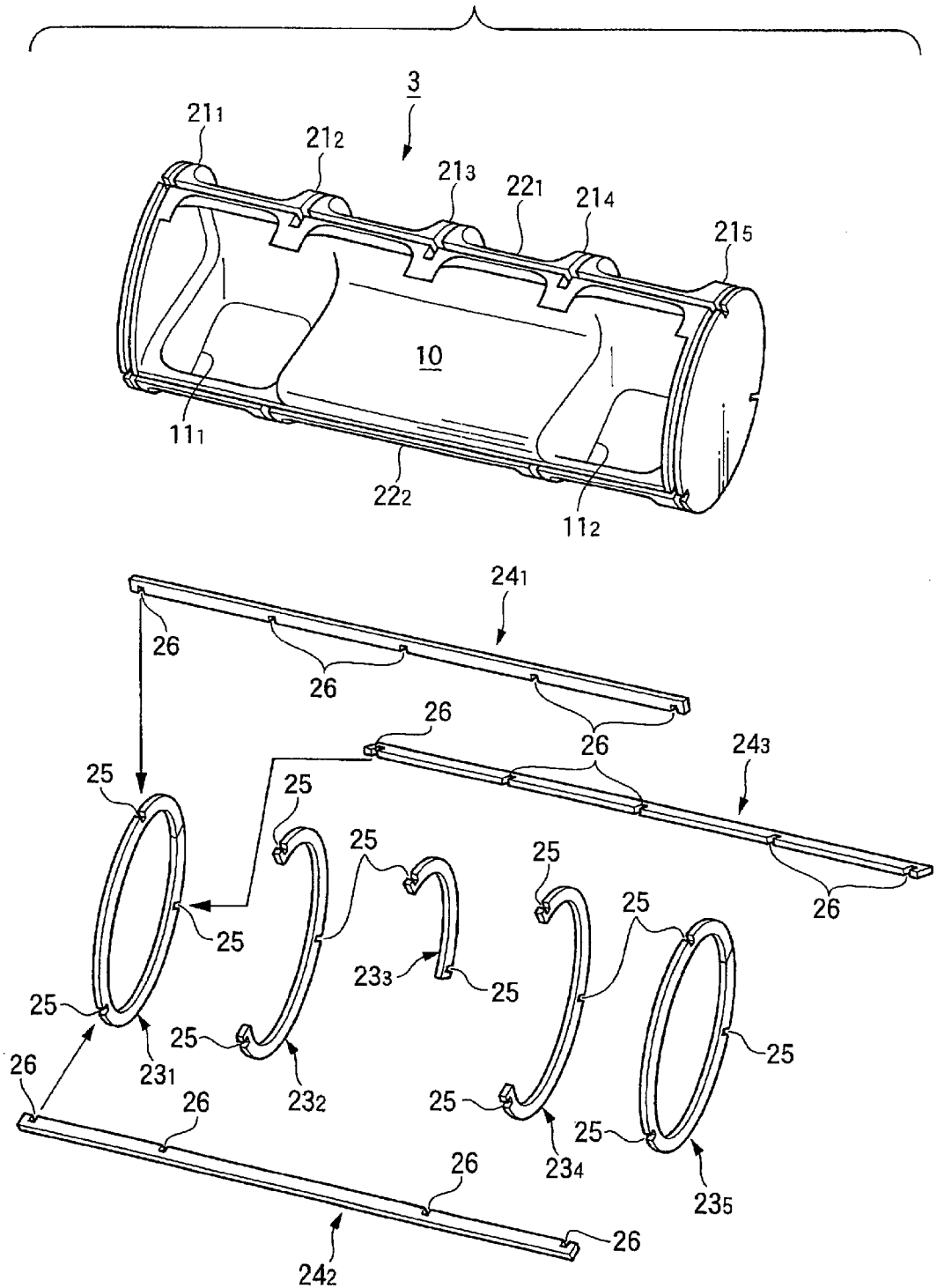
FIG. 26 is a perspective view of the rotary valve of FIG. 1 and seal members for use in a seal construction of the rotary valve according to a fifth embodiment of the invention.
Figure 27:
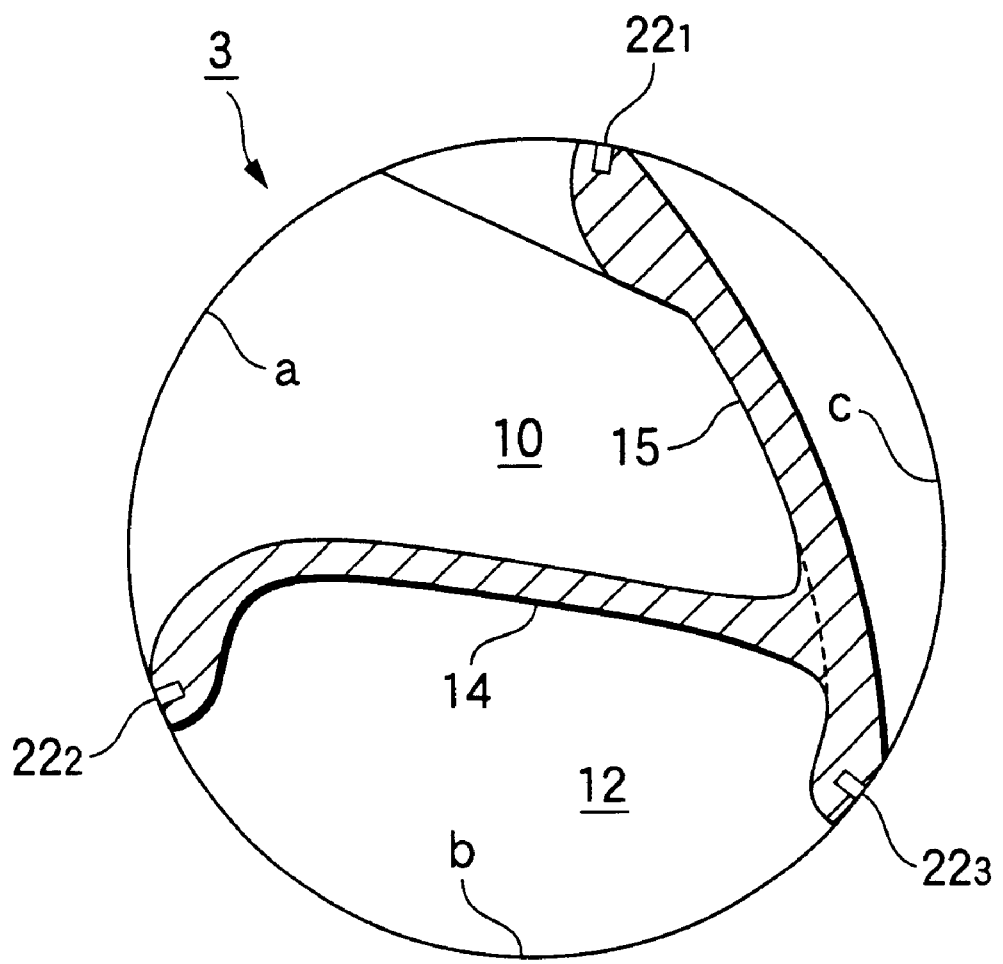
FIG. 27 is an enlarged cross-sectional view of the same rotary valve.

In FIG. 26, the first to fifth seal rings $23_1$ to $23_5$ show positional relationships resulting when they are mounted in the corresponding sliding faces of the rotary valve 3, and the recessed portions 25 located at the same circumferential positions fittingly receive therein the corresponding recessed portions 26 of the same seal plate shown by an arrow.

The first and fifth seal rings $23_1$, $23_5$ are of the same shape, and the second and fourth seal rings $23_2$, $23_4$ are of the same shape. In addition, the first and third seal plates $24_1$, $24_3$ are of the same shape, this resulting in five types of seal members which are used in the seal construction of the rotary valve 3. However, as to the seal plates, they may be of the same shape, and if this is the case, there are four types of seal members, this making it possible to reduce the number of component parts to be used. In addition, resin materials are used for production of the seal members with a view to reducing the weight of the variable intake apparatus 1. Note that resin material may also be used for the intake manifold 2 and the rotary valve 3 so as to reduce further the weight of the variable intake apparatus 1.

Since the seal construction for the rotary valve 3 for application to the variable intake apparatus 1 in an in-line four-cylinder internal combustion engine is constructed as described above, the following advantages can be exhibited.

The seal construction for a rotary valve for a variable intake apparatus for an in-line four-cylinder internal combustion engine wherein the variable intake apparatus is constructed such that the four air intake passages $4_1$ to $4_4$ which are independent from each other and which connect to and communicate with respective cylinders Nos. 1 to 4 of the in-line four-cylinder internal combustion engine, respectively, at one ends and a single intake air collecting chamber 5 at the other ends thereof are arranged sideways in line with each other in a direction in which the cylinders of the internal combustion engine are arranged, and that the rotary valve 3 is provided at the intermediate portion along the length of the air intake passages in such a manner that the arc-like portion extending substantially one third the outer circumference of the rotary valve protrudes thereinto, the rotary valve 3 comprising a control means for switching over the rotary valve 3 in triple stages in response to the rotational speed of the internal combustion engine, so that not only is a communication established or cut off between all the air intake passages $4_1$ and $4_2$, $4_2$ and $4_3$, $4_3$ and $4_4$ which are adjacent to each other but also a communication is established between each of pairs of air intake passages $4_1$ and $4_4$, $4_2$ and $4_3$ (two pairs in total) connecting to and communicating with the respective cylinders of pairs of the cylinders which do not have successive intake strokes at the one ends thereof, respectively, is characterized in that; seal plates and seal rings are provided on the outer circumference of the rotary valve, the seal plates $24_1$ to $24_3$ being directed in an axially longitudinal direction of the rotary valve and mounted at three locations which are spaced away from each other in a circumferential direction of the rotary valve, and the seal rings $23_2$ to $23_4$ being directed in the circumferential direction of the rotary valve and mounted at locations which are spaced away from each other in the axially longitudinal direction of the rotary valve and cut off a communication between the air intake passages, and that the seal rings $23_2$ to $23_4$ are held by and made integral with the seal plates $24_1$ to $24_3$ at at least two locations where the seal rings intersect with the seal plates.

As a result, the seal plates $24_1$ to $24_3$ and the whole of the seal rings $23_1$ to $23_5$ including the seal rings $23_2$ to $23_4$ which constitute the seal members can be molded from resin separately and independently, whereby the constructions of molds for molding the seal members are simplified and the weight and production cost can be reduced. In addition, the holding construction for the seal rings $23_2$ to $23_4$ is simplified, whereby the seal rings $23_2$ to $23_4$ are able to be held securely by the seal plates $24_1$ to $24_3$ and the operation of assembling the seal members to the rotary valve can be eased.

Additionally, even if the respective seal members expand and deform due to an increase in the atmospheric temperature or the like after they have been assembled together, since the expansion and deformation so generated can be absorbed by clearances between the assembled component parts, even if the rotary valve that can be switched over in triple stages is located at any position of low, intermediate and high engine speed ranges of the internal combustion engine, the intended seal function can be maintained securely.

Furthermore, since the seal plates $24_1$ to $24_3$ and the seal rings $23_1$ to $23_5$ are made integral with each other through the fitting of the recessed portions 25, 26 formed in the seal plates and the seal rings, respectively, the construction of assembling and making integral the seal plates $24_1$ to $24_3$ and the seal rings $23_1$ to $23_5$ with each other is simplified, this facilitating further the assembling operation of the seal members to the rotary valve 3.

<Sixth Embodiment>

Figure 28:
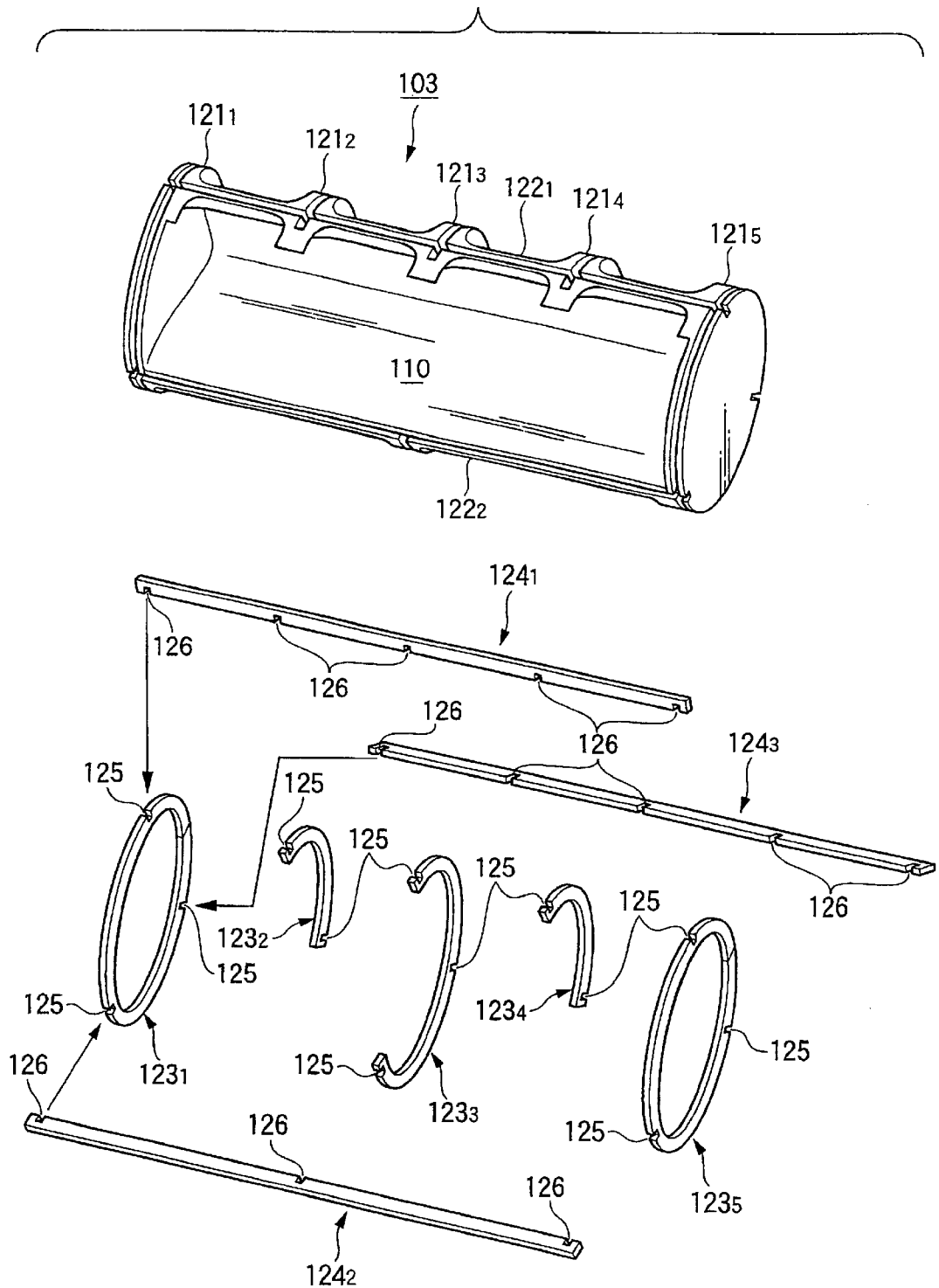
FIG. 28 is a perspective view showing the rotary valve shown in FIG. 9 and seal members for use in a seal construction of the same rotary valve according to a sixth embodiment of the invention, which corresponds to FIG. 26.

Next, referring to FIG. 28, a sixth embodiment of the invention in which a seal construction is fitted to the rotary valve of the variable intake apparatus according to the second embodiment of the invention will be described below.

The seal construction of a rotary valve applied to the variable intake apparatus 101 for an in-line four-cylinder internal combustion engine in the sixth embodiment differs from the seal construction of the rotary valve 103 described in the fifth embodiment as will be described below due to the difference in construction between the rotary valves 3 and 103 when the constructions of the two rotary valves are compared with each other.

First, when compared with the rotary valve 3 in the first embodiment, in the rotary valve 103 in the second embodiment, a third partition wall 114 has a length extending over a length over which four air intake passages $104_1$ to $104_4$ which are independent from each other are arranged sideways in line with each other, and two second communicating chambers $112_1$, $112_2$ are provided in parallel with each other on one side of the third partition wall 114. Additionally, there is provided inside no communicating path for establishing a communication in a shortcut fashion between the air intake passages $104_1$ to $104_4$ and the intake air collecting chamber 105. Then, in order to enable the construction like this to happen in the second embodiment, the air intake passage $104_4$ is disposed adjacent to the air intake passage $104_1$ except for a portion in the vicinity of where the air intake passage $104_4$ connects to the cylinder No. 4 at one end thereof, whereas the air intake passage $104_4$ is curved so as to intersect with the cylinders Nos. 2, 3 in the vicinity of where the same passage connects to the cylinder No. 4 at the one end thereof, whereby a communication is allowed to be established between each of the pairs of adjacent air intake passages $104_1$, $104_4$ and $104_2$, $104_3$.

In addition, the intake air collecting chamber 105 is fully closed relative to an intermediate portion of the air intake passages $104_1$ to $104_4$, whereby the shortcut communication is made impossible between the respective air intake passages $104_1$ to $104_4$ and the intake air collecting chamber 105. Due to this, the main body wall portion 108 is provided so as to extend as far as where lower edges of the openings $107_1$ to $107_4$ in the air intake passages $104_1$ to $104_4$ with the same curvature for joint thereto to thereby embrace an arc-like portion of the rotary valve 103 which corresponds to substantially two thirds of the outer circumference thereof. Note that there is no difference from the first embodiment in the configuration of a first partition wall 115 and three crescent-shaped partition walls 117 to 119 (see FIG. 9) of second partition walls.

In the six embodiment, since the rotary valve 103 is constructed as described above, second, third and fourth sliding faces $121_2$, $121_3$, $121_4$ which extend in the circumferential direction of the rotary valve 103 (refer to FIG. 28) constitute arc-like surfaces extending, respectively, substantially one third, substantially two thirds and substantially one third of the outer circumference of the rotary valve, and second, third and fourth seal rings $123_2$, $123_3$, $123_4$ which have arc lengths matching those arc lengths, respectively, are mounted in the second, third and fourth sliding faces $121_2$, $121_3$, $121_4$. In addition, the second seal plate $124_2$ that is to be mounted in the second sliding face $122_2$ extending in the axially longitudinal direction of the rotary valve only has three recessed portions 126 adapted to fit in the first, third and fifth seal rings $123_1$, $123_2$, $123_5$.

The sixth embodiment is different from the fifth embodiment in the aforesaid aspects, but since there is no other aspect in the sixth embodiment which is different from the fifth embodiment, a detailed description thereof will be omitted.

Since it is constructed as has been described heretofore, the sixth embodiment operates substantially similarly to the variable intake apparatus for an in-line four-cylinder internal combustion engine in the fifth embodiment and can provide similar advantages to those of the seal construction for a rotary valve applied to the variable intake apparatus for an in-line four-cylinder combustion internal engine described in the first embodiment. In particular, the communization of the seal members on both the fifth and sixth embodiments can be attained.

While only certain embodiments of the invention have been specifically described herein, it will apparent that numerous modifications may be made thereto without departing from the spirit and scope of the invention.

What is claimed is:

1. A variable intake apparatus for an in-line four-cylinder internal combustion engine, comprising:
    an intake manifold defining four air intake passages which are independent from each other and are curved so as to wind inwardly and a single intake air collecting chamber disposed in an internal space in the curved portion of said air intake passages, said four air intake passages connecting to and communicating with respective cylinders of the in-line four-cylinder internal combustion engine, respectively, at one ends thereof and said single intake air collecting chamber at the other ends thereof, said four air intake passages being arranged sideways in line with each other in a direction in which said cylinders of said internal combustion engine are arranged;
    a rotary valve located in said intake manifold in such a manner that a part of the outer circumference thereof projects into intermediate portions along the length of said air intake passages in an arc-like fashion; and
    a control unit switching over the rotary valve in triple stages in response to the rotational speed of said internal combustion engine,
    wherein said rotary valve establishes or cuts off a communication between said air intake passages which are adjacent to each other or between each of pairs of air intake passages connecting to and communicating with respective cylinders of pairs of cylinders which do not have successive intake strokes, at said one ends thereof, and wherein
    said control means is constructed such that at a low engine speed range of said internal combustion engine, a communication is cut off between said air intake passages which are adjacent to each other, at an intermediate engine speed range of said engine, a communication is established between each of said pairs of air intake passages connecting to and communicating with the respective cylinders of said pairs of cylinders which do not have successive intake strokes at one ends thereof, and at a high engine speed range thereof, a communication is established between said air intake passages which are adjacent to each other.

2. The variable intake apparatus as set forth in claim 1, wherein said rotary valve has three imaginary surfaces including first, second and third imaginary surfaces which are partitioned circumferentially at equal intervals as viewed from the side in an axial direction of said valve, said three imaginary surfaces being adapted to be circumferentially switched over in triple stages in response to the rotational speed of said internal combustion engine.

3. The variable intake apparatus as set forth in claim 2, wherein said rotary valve is provided between an intermediate portion along the length of said air intake passages and said intake air collecting chamber in such a manner as to establish or cut off a communication in a shortcut fashion between said respective air intake passages and said intake air collecting chamber, and
    a communication is established in a shortcut fashion between said respective air intake passages and said intake air collecting chamber at the high engine speed range.

4. The variable intake apparatus as set forth in claim 3, wherein a side of said first imaginary surface has a first communicating chamber for establishing a communication between said air intake passages which are adjacent each other, said first communicating chamber being constructed so as to establish a communication in a shortcut fashion between said respective air intake passages and said intake air collecting chamber.

5. The variable intake apparatus as set forth in claim 2, wherein a side of said second imaginary surface has two second communicating chambers for establishing a communication between each of said two pairs of air intake passages connecting to and communicating with the respective cylinders of said pairs of cylinders which do not have successive intake strokes at one ends thereof, and wherein one of said two second communicating chambers is constructed so as to establish a communication between a pair of air intake passages which are adjacent to each other, whereas the other of said two second communicating chambers is constructed so as to establish a communication between a pair of air intake passages which are spaced away from each other.

6. The variable intake apparatus as set forth in claim 5, wherein a side of a first imaginary surface has a first communicating chamber for establishing a communication between said air intake passages which are adjacent each other, and said one of said two second communicating chambers includes a chamber portion formed when said first communicating chamber is closed with a main body wall of said variable intake apparatus.

7. The variable intake apparatus as set forth in claim 2, wherein a side of said third imaginary surface has a partition wall for cutting off a communication between said air intake passages which are adjacent to each other, said partition wall being constructed so as to cut off a communication between said respective air intake passages and said intake air collecting chamber based on the rotation of said rotary valve.

8. The variable intake apparatus as set forth in claim 2, wherein said rotary valve has in an interior thereof four passages which are independent from each other and two communicating chambers, wherein said four passages of said rotary valve are defined by a first partition wall extending between two vertexes of an equilateral triangle that is obtained by dividing equilaterally circumferentially the outer circumference of said rotary valve into three and having a length corresponding to the length over which said four air intake passages are arranged sideways in line with each other and three second partition walls which are provided on said first partition wall contiguously therewith so as to cut off a communication between said adjacent air intake passages, said four passages being made to open outwardly, wherein one of said two communicating chambers is defined by a third partition wall extending between a remaining vertex of said equilateral triangle and one side edge or a point in the vicinity of said one side edge of said first partition wall and having a length corresponding to the length over which said two central air intake passages are arranged sideways in line with each other and two fourth partition walls provided at least on said third partition wall contiguously therewith so as to cut off a communication between the left-side pair of adjacent air intake passages and the right-side pair of adjacent air intake passages, respectively, said one of said two communicating chambers being made to open outwardly, and wherein the other of said two communicating chambers consists of a space resultant when excluding said four passages and said one of said two communicating chambers, said the other of said two communicating chambers being made to open outwardly.

9. The variable intake apparatus as set forth in claim 2, wherein seal plates are mounted on an outer circumferential surface of said rotary valve at three locations which are directed in an axially longitudinal direction and spaced away from each other in a circumferential direction, and wherein seal rings are mounted on the outer circumferential surface of said rotary valve at locations which are directed in the circumferential direction, spaced away from each other in the axially longitudinal direction and cuts off a communication between said air intake passages, said seal rings being integrally retained at least two locations which intersect with said seal plates.

10. The variable intake apparatus as set forth in claim 9, wherein said seal plates and said seal rings are made integral with each other through fitting of recessed portions formed, respectively, in said seal plates and said seal rings.

11. The variable intake apparatus as set forth in claim 1, wherein said four air intake passages are arranged in parallel in the arrangement direction of said cylinders of said internal combustion engine such that said air intake passages connecting to and communicating with pairs of the cylinders which do not have successive intake strokes are located sideways adjacent to each other except for an intersecting portion of said air intake passages which is in the vicinity of where said air intake passages connect to and communicate with said respective cylinders of said engine at said one ends thereof.

12. The variable intake apparatus as set forth in claim 11, wherein said rotary valve has three imaginary surfaces including first, second and third imaginary surfaces which are partitioned circumferentially at equal intervals as viewed from the side in an axial direction of said valve, said three imaginary surfaces being adapted to be circumferentially switched over in triple stages in response to the rotational speed of said internal combustion engine.

13. The variable intake apparatus as set forth in claim 12, wherein said rotary valve is disposed in such a manner that substantially one third of the outer circumference thereof projects into an intermediate portion along the length of said air intake passages in an arc-like fashion, while at least a part of the remaining portion of the outer circumference thereof is embraced by a wall of said intake air collecting chamber.

14. The variable intake apparatus as set forth in claim 13, wherein said rotary valve has four passages which are independent from each other and three communicating chambers, said four passages and said three communicating chambers being respectively made to open outwardly, wherein said four passages of said rotary valve are defined by a first partition wall extending between two vertexes of an equilateral triangle that is obtained by dividing equilaterally circumferentially the outer circumference of said rotary valve into three and having a length corresponding to the length over which said four air intake passages are arranged sideways in line with each other and three second partition walls which are provided on said first partition wall contiguously therewith so as to cut off a communication between said adjacent air intake passages, wherein two of said three communicating chambers are defined and by a third partition wall extending between a remaining vertex of said equilateral triangle and one side edge or a point in the vicinity of said one side edge of said first partition wall and having a length corresponding to the length over which said two central air intake passages are arranged sideways in line with each other and a fourth partition wall provided at least on said third partition wall contiguously therewith so as to cut off a communication between the two centrally positioned adjacent air intake passages of said four air intake passages, and wherein the other of said three communicating chambers consists of a space resultant when excluding said four passages and said two of said three communicating chambers.

15. The variable intake apparatus as set forth in claim 11, wherein said rotary valve has three imaginary surfaces including first, which are partitioned circumferentially as viewed from the side in an axial direction of said valve, said three imaginary surfaces being adapted to be circumferentially switched over in triple stages in response to the rotational speed of said internal combustion engine, wherein said rotary valve is provided in such a manner that substantially one fourth of the outer circumference thereof projects into an intermediate portion along the length of said air intake passageways in an arc-like fashion, and wherein said three imaginary surfaces comprises two imaginary surfaces which are each an arc having a length equal to one fourth of the outer circumference of said rotary valve and one imaginary surface which is an arc having a length equal to a half of the outer circumference of said rotary valve.

16. The variable intake apparatus as set forth in claim 15, wherein said rotary valve has four passages which are independent from each other and three communicating chambers, said four passages and said three communicating chambers being respectively made to open outwardly, wherein said four passages of said rotary valve are defined by a first partition wall extending between two vertexes of a quadrate that is obtained by dividing equilaterally circumferentially the outer circumference of said rotary valve into four and having a length corresponding to the length over which said four air intake passages are arranged sideways in line with each other and three second partition walls which are provided on said first partition wall contiguously therewith so as to cut off a communication between said adjacent air intake passages, wherein two of said three communicating chambers are defined by a third partition wall extending between two vertexes of said quadrate which face each other diagonally and having a length corresponding to the length over which said four air intake passages are arranged sideways in line with each other and a fourth partition wall provided so as to contiguously extend between said third partition wall and said first partition wall to thereby cut off a communication between the two centrally positioned adjacent air intake passages of said four air intake passages, and wherein the other of said three communicating chambers consists of a space resultant when excluding said four passages and said two of said three communicating chambers.

* * * * *